US011694400B2

(12) United States Patent
Delgado

(10) Patent No.: US 11,694,400 B2
(45) Date of Patent: Jul. 4, 2023

(54) SYSTEMS AND METHODS FOR SUPPLEMENTING DIGITAL MEDIA WITH THREE-DIMENSIONAL (3D) MODELS

(71) Applicant: SHOPIFY INC., Ottawa (CA)

(72) Inventor: Byron Leonel Delgado, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/337,601

(22) Filed: Jun. 3, 2021

(65) Prior Publication Data
US 2022/0392159 A1   Dec. 8, 2022

(51) Int. Cl.
G06T 17/20 (2006.01)
G06F 3/04842 (2022.01)
G06T 15/04 (2011.01)
G06T 15/50 (2011.01)

(52) U.S. Cl.
CPC .......... G06T 17/20 (2013.01); G06F 3/04842 (2013.01); G06T 15/04 (2013.01); G06T 15/50 (2013.01); G06F 2203/04806 (2013.01); G06T 2200/24 (2013.01); G06T 2210/36 (2013.01)

(58) Field of Classification Search
CPC combination set(s) only.
See application file for complete search history.

(56) References Cited

U.S. PATENT DOCUMENTS

| | | | |
|---|---|---|---|
| 9,704,270 B1 * | 7/2017 | Main .................. | G06T 15/60 |
| 10,460,516 B1 | 10/2019 | Eastham et al. | |
| 11,126,320 B1 * | 9/2021 | Thompson ............ | G06F 3/0482 |
| 11,367,263 B1 * | 6/2022 | Devernay ................. | G06T 7/80 |
| 2011/0096083 A1 * | 4/2011 | Schultz .................... | G06T 15/04 703/1 |
| 2012/0050285 A1 * | 3/2012 | Kannenberg ........... | G09B 29/10 345/419 |
| 2013/0050204 A1 * | 2/2013 | Samokhin .............. | G01C 21/32 345/419 |
| 2014/0047381 A1 * | 2/2014 | Fan ........................ | G06F 3/0482 715/800 |
| 2015/0356058 A1 * | 12/2015 | Jwa ........................ | G06F 40/106 715/252 |
| 2016/0093078 A1 * | 3/2016 | Davis ..................... | G06T 19/003 345/629 |
| 2016/0217590 A1 * | 7/2016 | Mullins ..................... | G06T 7/40 |
| 2017/0201689 A1 * | 7/2017 | Zilberman ....... | H04N 21/41265 |
| 2018/0005454 A1 * | 1/2018 | Suni ........................ | G06T 17/05 |
| 2018/0114369 A1 * | 4/2018 | Stanley .................. | G06T 19/20 |
| 2018/0330480 A1 * | 11/2018 | Liu ........................ | G06T 19/20 |
| 2018/0349413 A1 * | 12/2018 | Shelby ................ | G01C 21/206 |

(Continued)

Primary Examiner — Andrew G Yang

(57) ABSTRACT

High-fidelity three-dimensional (3D) models and other high-fidelity digital media that depict objects with a high-level of detail may be computationally demanding to display on some devices. According to some embodiments of the present disclosure, digital media may be supplemented with one or more 3D models to improve the overall level of detail provided by the digital media without excessively increasing computational requirements. An example computer-implemented method includes instructing a user device to display digital media depicting an object, receiving an indication selecting a region of the depicted object, and instructing the user device to display a 3D model corresponding to the selected region of the depicted object, where the 3D model is different from the digital media.

25 Claims, 14 Drawing Sheets

(56) References Cited

U.S. PATENT DOCUMENTS

2019/0130649 A1    5/2019  O'Brien et al.
2019/0205646 A1*   7/2019  Piramuthu ............. G06N 20/00
2022/0198737 A1*   6/2022  Enthed .................. G06T 15/205

* cited by examiner

FIG. 14

SYSTEMS AND METHODS FOR SUPPLEMENTING DIGITAL MEDIA WITH THREE-DIMENSIONAL (3D) MODELS

FIELD

The present application relates to displaying digital media on a device and, in particular embodiments, to supplementing digital media displayed on a device.

BACKGROUND

Three-dimensional (3D) models allow users to view and interact with virtual objects. High-fidelity 3D models may be capable of providing highly realistic representations of objects, which may make the objects appear life-like. However, generating, storing and rendering high-fidelity 3D models may be computationally demanding.

SUMMARY

Some embodiments of the present disclosure relate to supplementing digital media with one or more 3D models to improve the overall level of detail provided by the digital media. This digital media may be an image, a video or a 3D model that represents an object. In order to limit the storage requirements and/or other computational requirements associated with displaying the digital media on a user device, the digital media may have a limited fidelity and/or resolution. This may enable the digital media to be implemented on many different types of user devices having different computational capabilities. Within a certain zoom range, the digital media may be able to clearly depict the object. However, if a user zooms in beyond this zoom range to focus on a selected region of the object, then the digital media may fail to clearly depict the selected region. For example, the digital media may have a limited resolution that may result in the selected region of the object appearing blurry or pixelated in the zoomed in digital media. Accordingly, when the level of zoom exceeds the level of detail provided by the digital media, a detailed 3D model of the selected region may be used to supplement the digital media. In some implementations, the digital media is replaced with the 3D model in a display of the user device. The 3D model may provide a detailed representation of the region for the user. The 3D model might only represent a subset of the object, rather than the entirety of the object, in order to reduce the computational requirements associated with displaying the 3D model.

If the user zooms out from the detailed 3D model to view a larger region of the object that can be clearly depicted by the digital media, then the 3D model may be replaced with the original digital media in the display of the user device. This may enable the user to view the object as a whole once again. The user may then zoom in on the digital media to focus on a different region of the object, which may result in another detailed 3D model being presented on the display of the user device to represent this region of the object. The transitions between displaying the digital media and displaying detailed 3D models on the user device may be relatively seamless from the perspective of the user. In this way, the detailed 3D models may extend the fidelity of the digital media such that digital media itself appears to be highly detailed, without having the correspondingly high computational requirements.

According to an aspect of the present disclosure, there is provided a computer-implemented method comprising instructing a user device to display digital media depicting an object (e.g., a 3D model corresponding to the object), receiving an indication selecting a region of the depicted object, and instructing the user device to display a 3D model corresponding to the selected region of the depicted object. The 3D model may be different from the digital media. The 3D model may be limited to representing a subset of the depicted object, where the subset includes the selected region of the depicted object. In some embodiments, the 3D model includes a bump map for the selected region.

In some embodiments, the method further includes determining, based on a criterion and the selected region, that the 3D model should be displayed on the user device. The user device might then be instructed to display the 3D model responsive to the determination. The criterion may include a resolution for depicting the selected region with a target quality, a zoom level for depicting the selected region with a target quality, and/or a fidelity for depicting the selected region with a target quality.

In some embodiments, the digital media includes a plurality of identifiers corresponding to respective regions of the object. Instructing the user device to display the 3D model may include determining a particular identifier of the plurality of identifiers that corresponds to the selected region and selecting the 3D model based on the particular identifier. The particular identifier may correspond to a particular material, in which case the 3D model may include a 3D representation of the particular material.

In some embodiments, the selected region is a first region and, after instructing the user device to display the 3D model, the method further includes receiving a further indication selecting a second region of the depicted object; determining, based on a criterion and the second region, that the digital media should be displayed on the user device; and, responsive to determining that the digital media should be displayed on the user device, instructing the user device to display the digital media.

In some embodiments, instructing the user device to display the 3D model includes instructing the user device to display a render of the 3D model generated based on an orientation and a size of the selected region.

In some embodiments, instructing the user device to display the 3D model includes determining lighting of the selected region as depicted in the digital media and applying the lighting to the 3D model.

In some embodiments, instructing the user device to display the 3D model includes instructing the user device to replace the digital media with the 3D model on a display of the user device.

In some embodiments, instructing the user device to display the digital media includes transmitting the digital media to the user device, and instructing the user device to display the 3D model includes transmitting the 3D model to the user device.

According to another aspect of the present disclosure, there is provided a system including memory and at least one processor. The memory is configured to store digital media depicting an object and a 3D model corresponding to a region of the depicted object. The 3D model may be different from the digital media. The 3D model may be limited to representing a subset of the depicted object, the subset including the region of the depicted object. The at least one processor may be configured to instruct a user device to display the digital media, receive an indication selecting the region of the depicted object, and instruct the user device to display the 3D model.

In some embodiments, the at least one processor is configured to determine, based on a criterion and the region, that the 3D model should be displayed on the user device. The at least one processor may also be configured to instruct the user device to display the 3D model responsive to the determination that the 3D model should be displayed on the user device.

In some embodiments, the digital media includes a plurality of identifiers corresponding to respective regions of the object. The at least one processor may be configured to determine a particular identifier of the plurality of identifiers that corresponds to the region and select the 3D model based on the particular identifier. The particular identifier may correspond to a particular material, and the 3D model may include a 3D representation of the particular material.

In some embodiments, the region is a first region, and the at least one processor is configured to receive a further indication selecting a second region of the depicted object; determine, based on a criterion and the second region, that the digital media should be displayed on the user device; and, responsive to the determination that the digital media should be displayed on the user device, instruct the user device to display the digital media.

In some embodiments, the at least one processor is configured to instruct the user device to display a render of the 3D model generated based on an orientation and a size of the region.

In some embodiments, the at least one processor is configured to determine lighting of the region as depicted in the digital media and apply the lighting to the 3D model.

In some embodiments, the at least one processor is configured to instruct the user device to replace the digital media with the 3D model on a display of the user device.

According to yet another aspect of the present disclosure, there is provided a non-transitory computer readable medium storing computer executable instructions. When executed by a computer, the computer executable instructions cause the computer to instruct a user device to display digital media depicting an object, receive an indication selecting a region of the depicted object, and instruct the user device to display a 3D model corresponding to the selected region of the depicted object, where the 3D model may be different from the digital media.

BRIEF DESCRIPTION OF THE DRAWINGS

Embodiments will be described, by way of example only, with reference to the accompanying figures wherein:

FIG. 14 is an example of a home page of an administrator, according to an embodiment.

DETAILED DESCRIPTION

For illustrative purposes, specific example embodiments will now be explained in greater detail below in conjunction with the figures.

Three-Dimensional (3D) Models

Three-dimensional (3D) models allow users to view and interact with virtual objects. In some embodiments, a 3D model is generated to reflect the shape, texture and/or other properties of a real-world object. Any of a variety of applications may implement 3D models, including video gaming, e-commerce, computer-aided design (CAD), medical imaging and scientific imaging, to name but a few. In one example, 3D models may be implemented to virtually present products to customers for online merchandising. In another example, 3D models may be implemented to allow a doctor to virtually view a patient's body part to help form a diagnosis.

Figure 1:
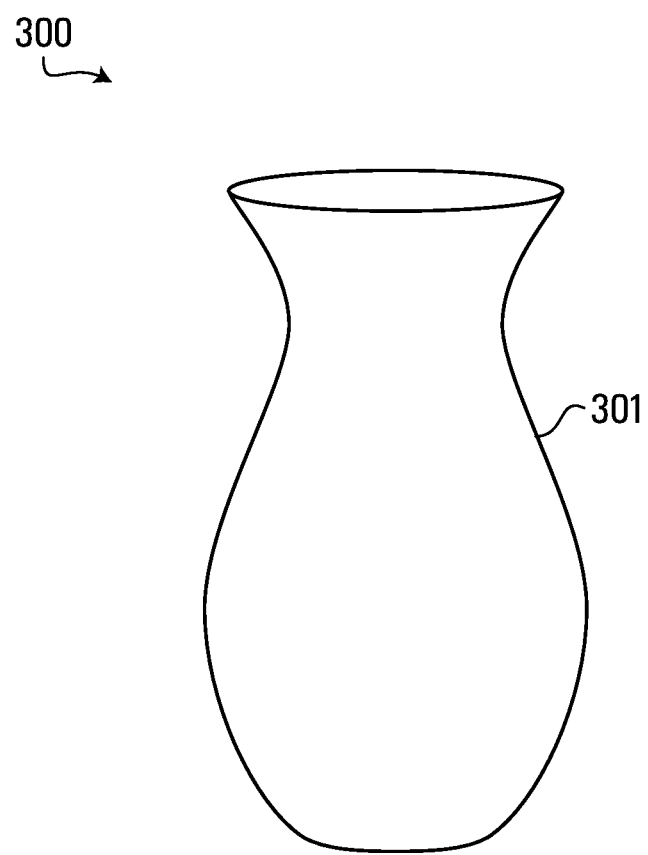
FIG. 1 illustrates an example of a 3D model.
Figure 2:
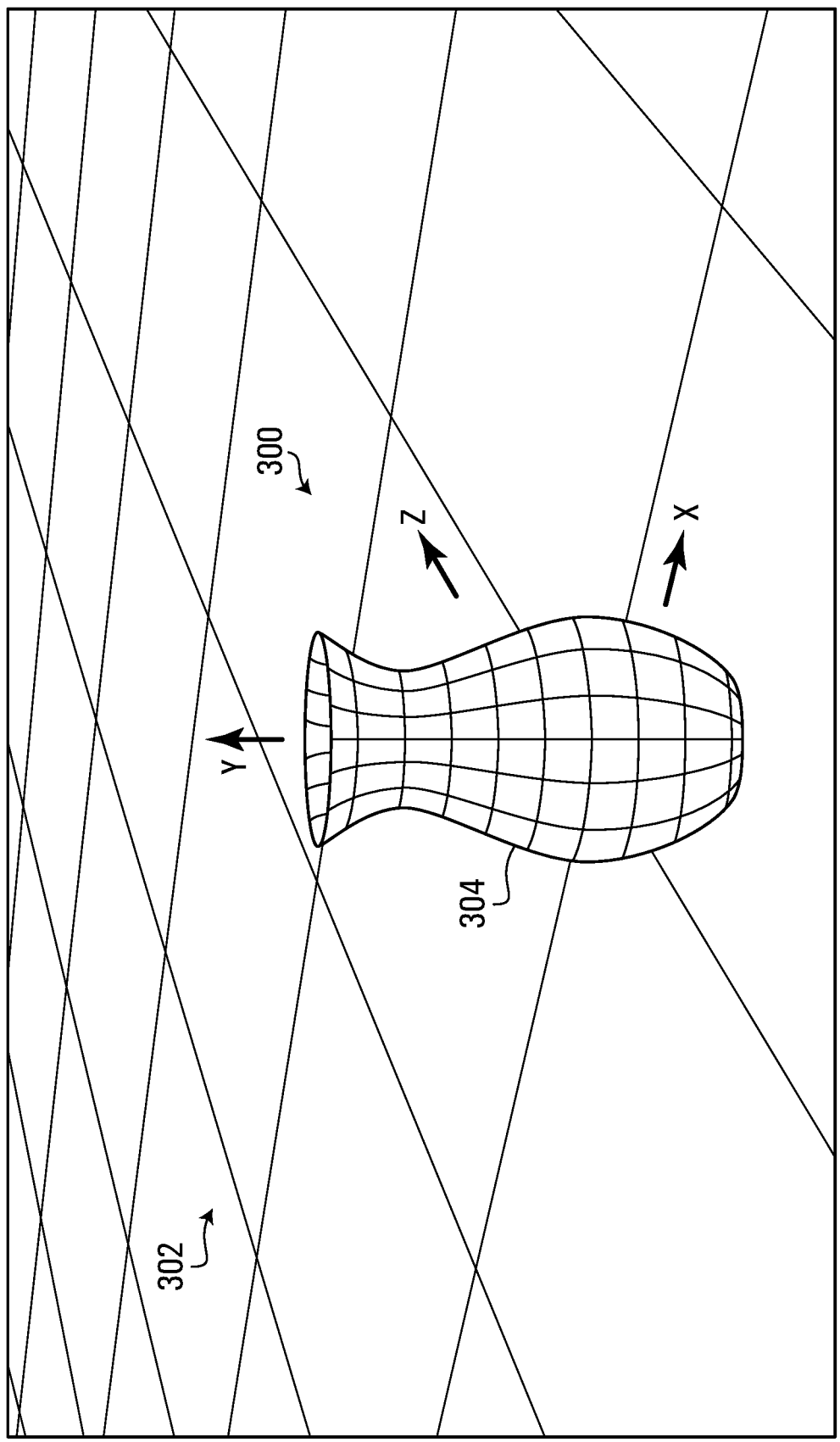
FIG. 2 illustrates a mesh of the 3D model of FIG. 1 defined within a virtual coordinate system.
Figure 3:
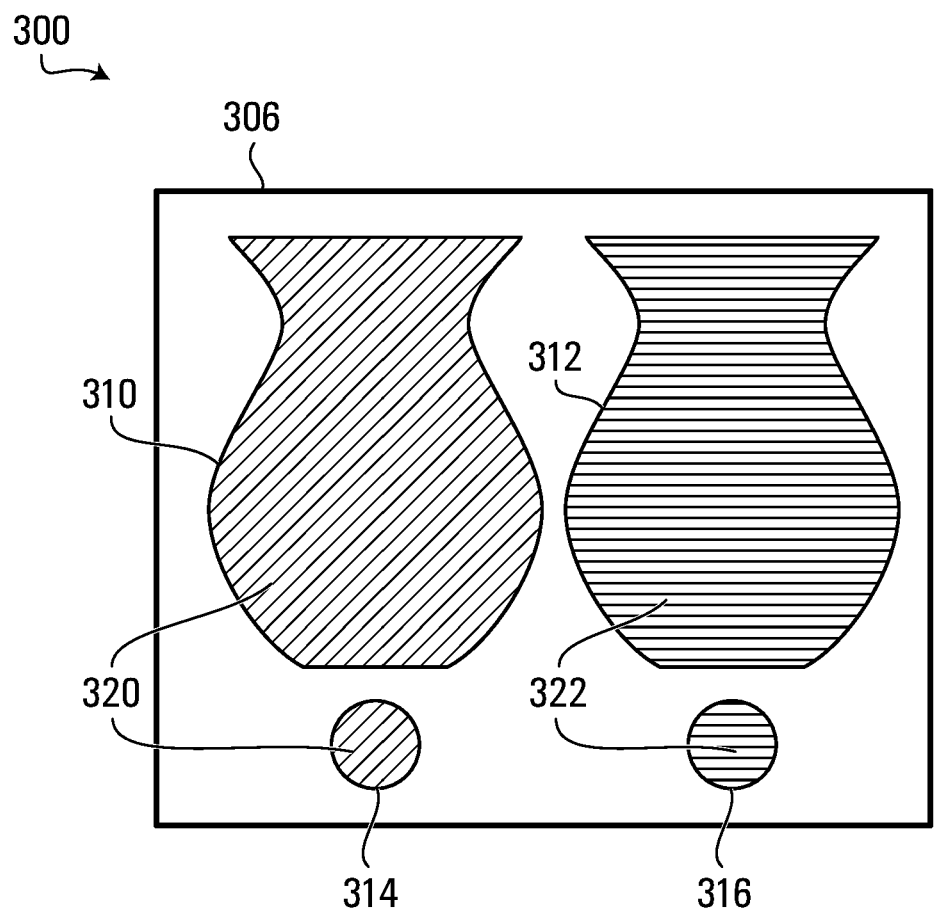
FIG. 3 illustrates a texture map of the 3D model of FIG. 1.

FIGS. 1 to 3 illustrate an example of a 3D model 300 of an object 301. FIG. 1 illustrates the 3D model 300, FIG. 2 illustrates a mesh 304 of the 3D model 300 defined within a virtual coordinate system 302, and FIG. 3 illustrates a texture map 306 of the 3D model 300. The object 301 is shown as a vase; however, this is only an example.

The 3D model 300 provides a mathematical representation of the object 301 that is defined with a length, width, and height. The mesh 304 may include an interconnected set of vertices, edges and surfaces that reflect the shape of the object 301. In some implementations, images, videos, 3D scans and/or other measurements of the object 301 in the real-world may be used to help generate the mesh 304. Analysis of the measurements may provide the relative positions of multiple feature points on the object 301. After determining the relative positions of the feature points, the mesh 304 may be generated by mapping the feature points to vertices in the virtual coordinate system 302 and interconnecting the vertices to form virtual surfaces that simulate the physical surfaces of the object 301. The mesh 304 may also or instead be at least partially generated through user input at a user device. For example, the mesh 304 may be generated through manual placement and/or manipulation of the vertices and/or the virtual surfaces. The mesh 304 may be a polygonal mesh in some implementations; however, other types of meshes are also possible.

The texture map 306 may be a 2D image or other data structure representing the texture and/or shading of the object 301 in the 3D model 300. The texture map 306 may be mapped to the mesh 304 to provide an appearance (e.g., a color and/or a pattern) for the virtual surfaces defined by the mesh 304. For example, the pixels of the texture map 306 may correspond to, and provide detail for, respective locations on the virtual surfaces of the mesh 304. As shown, the texture map 306 includes the area 310 representing the exterior sidewall of the object 301, an area 312 representing the interior sidewall of the object 301, an area 314 representing the exterior bottom wall of the object 301, and an area 316 representing the interior bottom wall of the object 301. The areas 310, 314 correspond to a material 320 (shown using diagonal hatching) on the exterior surfaces of the object 301, and the areas 312, 316 correspond to another material 322 (shown using horizontal hatching) on the interior surfaces of the object 301. For example, the exterior of the object 301 may be painted or coated with the material 320, which is not added to the interior. As a result, the exterior and interior surfaces of the object 301 may have different material properties that are reflected in the texture map 306. In some implementations, the texture map 306 includes, or is based on, one or more material models that simulate the materials 320, 322. For example, the texture map 306 may define the areas 310, 314 using a material model for the material 320 and define the areas 312, 316 using a material model for the material 322. These material models may simulate, inter alia, light interactions for shading the 3D model 300. Examples of light interactions include diffuse lighting, ambient lighting and specular lighting.

Optionally, the texture map 306 may include 3D information for the surfaces of the object 301, such as a height map, for example. The height map may store surface elevation data to simulate bumps and wrinkles on the surfaces of the object 301. The height map may be used in bump mapping to simulate shadows on the surfaces of the object 301 and/or may be used in displacement mapping to simulate a 3D textured surface, for example.

At least a portion of the texture map 306 may be derived from measurements of the object 301. For example, the texture map 306 may include or be based on photographs and/or 3D scans of the object 301. The texture map 306 may also or instead be at least partially computer-generated through user input at a user device.

The fidelity or accuracy of the 3D model 300 might define the level of detail at which the object 301 is represented. A high-fidelity 3D model may provide a realistic and even life-like representation of an object. For example, a high-fidelity 3D model may include a detailed 3D geometry reflecting the shape of an object and/or a detailed texture depicting the surfaces of the object. The detailed 3D geometry may be defined by a dense mesh with a high polygon count, and the detailed texture may be defined by a high-resolution texture map. The texture map may also include 3D information in the form of a height map, for example. A high-fidelity 3D model may be magnified (e.g., zoomed in on) to allow a user to inspect certain areas or regions of a virtual object closely, much like a real-life object can be inspected closely to see finer levels of shape and texture. Magnifying a high-fidelity 3D model might also provide extra levels of detail for an object that are beyond what might be possible by examining a real-life object using the naked eye. This extra level of detail may help replace the lost physicality of a real-world object. For example, the additional extra level of detail may visually indicate the feel of a material, which could help replace the missing capability of physically touching that material.

However, the use of high-fidelity 3D models may be computationally intensive. For example, implementing high-fidelity models might involve storing large amounts of data. In web-based applications, this large amount of data may also need to be transmitted over a network to a user device, which may be bandwidth intensive. Further, large amounts of processing power may be required to render high-fidelity 3D models. It might not be feasible to implement high-fidelity 3D models in some applications. For example, high-fidelity 3D models may not function smoothly on many personal and mobile electronic devices.

The fidelity of a 3D model may be limited to conserve computing resources and help ensure a consistent and smooth experience on a variety of user devices. Low-fidelity and moderate-fidelity 3D models may have reasonable computational requirements that may be met by many different types of user devices. However, low-fidelity or moderate-fidelity 3D models might only provide coarse or approximate representations of objects. For example, the true shape and/or texture of an object may be only roughly represented by a low-fidelity 3D model. This may limit the extent to which the low-fidelity 3D model can be magnified to allow a user to inspect details of the object. At a certain level of zoom, renders of the low-fidelity model may appear pixelated or blurry. In this way, low-fidelity 3D models might not allow for the close inspection of virtual objects.

By way of example, web-based software applications may enable 1024×1024 pixel texture maps for 3D models, and desktop and mobile software applications may enable 2048× 2048 pixel texture maps. These texture map resolutions may impose a limit on the level of detail that a 3D model can provide. For example, at a certain level of zoom, renders of the 3D model may only include a small portion of the texture map for the 3D model and may appear pixelated as a result.

Consider a case in which a user is interacting with the 3D model 300 of FIGS. 1 to 3. The texture map 306 may be limited to 1024×1024 pixels and/or the mesh 304 may be limited to a certain number of polygons. While renders of the 3D model 300 may appear clear and unpixelated when viewing the object 301 as a whole, magnifying the 3D model 300 might not provide any information regarding the finer details of the object 301. For example, zooming in on the exterior sidewall of the object 301 might return a pixelated render of the 3D model 300 that includes only a small portion of the texture map 306. This render might not include any indication of the material properties of the object 301 or indicate the feel of the object 301. In this way, 3D models with limited fidelity may be unsuitable for depicting the materials and other fine details of an object.

Visualizing and understanding the materials that an object is made from using a 3D model may be important in a variety of applications. By way of example, in an e-commerce setting, a customer may want to appreciate the look and feel of a product's materials in order to assess the overall durability and quality of the product. For example, when selecting fabrics for apparel or furniture, material may be a core factor in purchase decisions. Using a 3D model of a product, customers may need to zoom in to a certain level of detail to appreciate the material properties of the product. Providing this level of detail in the 3D model may ultimately impact sales conversion (i.e., whether or not a customer completes a purchase transaction for the product). However, as noted above, storing and rendering high-fidelity 3D models that provide a high level of detail may result in a poor user experience on certain devices with limited computing resources (e.g., mobile devices).

There is a need for systems and methods that can depict a virtual object with a high level of detail without correspondingly high computational demands. In some embodiments, multiple instances of digital media are used to represent a single object to provide this high level of detail. The digital media may include, inter alia, one or more images, videos and/or 3D models depicting an object or portions thereof. By way of example, a first 3D model that represents an entire object could be initially displayed on a user device. The first 3D model may have a fidelity that enables smooth operation on the user device, but as a result may only provide a limited level of detail. When a user zooms in on a region of the object that is smaller than what the first 3D model can clearly depict, then the first 3D model may be replaced by a second 3D model representing that region of the object. The second 3D model might only represent the zoomed in region of the object and therefore may be able to depict the region at a high level of detail without being overly computationally intensive to implement. For example, the region of the object may correspond to a certain material, and the second 3D model may be provided to represent only that material. This may allow a user to appreciate the feel of the material on the object without having to implement a high-fidelity 3D model of the entire object.

Figure 4:
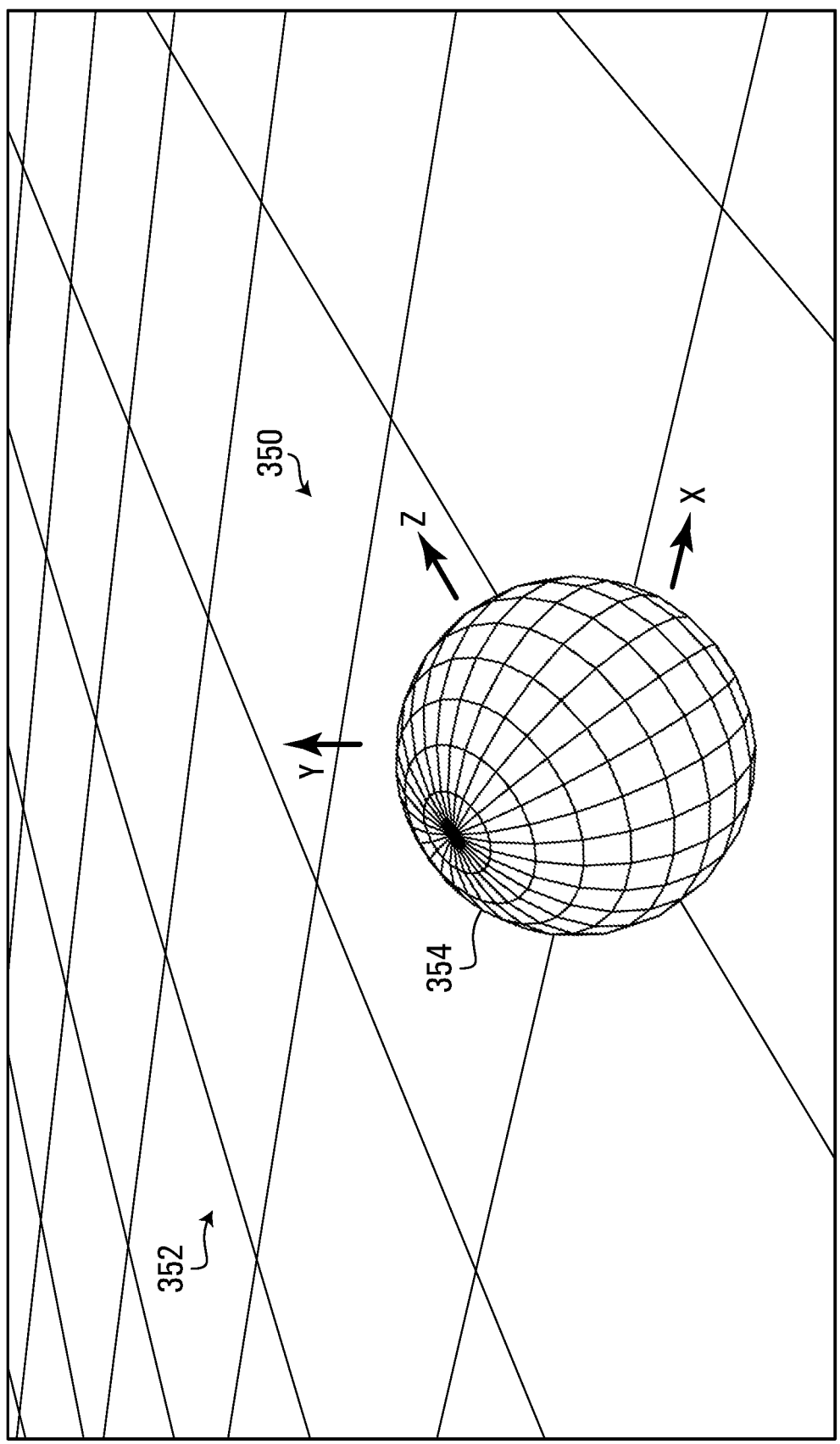
FIG. 4 illustrates a mesh of another 3D model defined within a virtual coordinate system, according to an embodiment.
Figure 5:
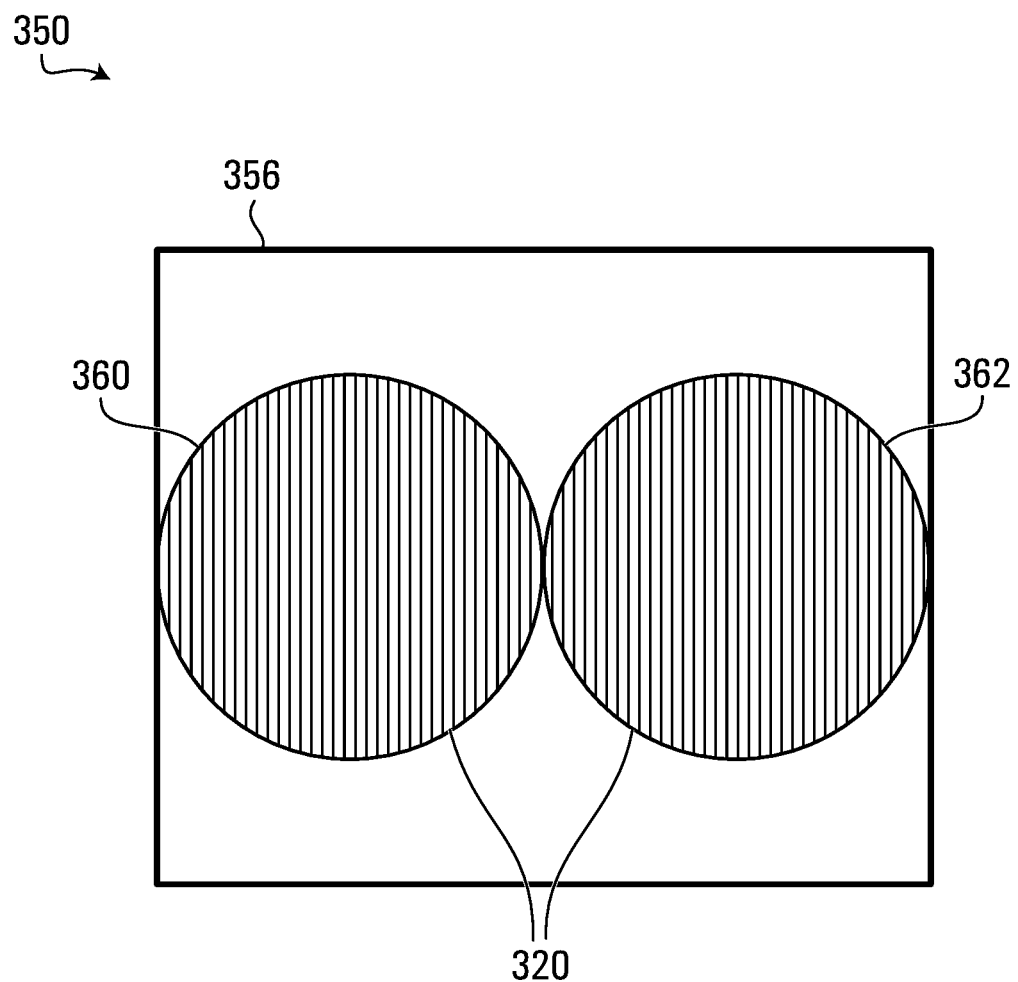
FIG. 5 illustrates a texture map of the 3D model of FIG. 4.

FIGS. 4 and 5 illustrate an example of a 3D model 350 corresponding to the exterior sidewall of the object 301. FIG. 4 illustrates a mesh 354 of the 3D model 350 defined within a virtual coordinate system 352, and FIG. 5 illustrates a texture map 356 of the 3D model 350. The mesh 354 is in the general shape of a sphere, which is a relatively simple geometric shape that may reduce the complexity of storing and rendering the 3D model 350. The texture map 356 includes two circular areas 360, 362 that correspond to the top and bottom hemispheres of the mesh 354. The areas 360, 362 simulate the material 320 on the exterior sidewall of the object 301, optionally using a material model. The texture map 356 may include 3D texture information for the material 320 in the form of a height map, for example. In some implementations, a bump map is used to simulate bumps or wrinkles on the exterior sidewall of the object 301 during shading of the 3D model 350. Advantageously, using a height map to add 3D texture may be more computationally efficient than adding the 3D texture using a dense mesh.

The 3D models 300, 350 may be used in combination to provide a detailed representation of the object 301 without requiring the 3D model 300 to be a high-fidelity 3D model. For example, the 3D model 300 may be replaced with the 3D model 350 on a display of a user device when a user zooms in on the exterior sidewall of the object 301. Rather than display a coarse and/or pixilated render of the 3D model 300 on the user device, the 3D model 350 may be used to more clearly depict the zoomed in exterior sidewall of the object 301. In some implementations, the texture maps 306, 356 are each 1024×1024 pixels in size, but because the texture map 356 only corresponds to the material 320 of the object 301, the texture map 356 may depict the material 320 with a greater level of detail than the texture map 306. The texture map 356 may also include 3D information for the material 320 to provide further detail. The renders of the 3D model 350 may provide a detailed depiction of the material 320 on the exterior sidewall of the object 301, which may allow a user to appreciate the finer details and even the feel of the object 301. In some cases, the renders might only depict a relatively small area of the mesh 354, such that the overall spherical shape of the mesh 354 is not apparent from the renders.

Example System and Methods for Supplementing Digital Media with 3D Models

Figure 6:
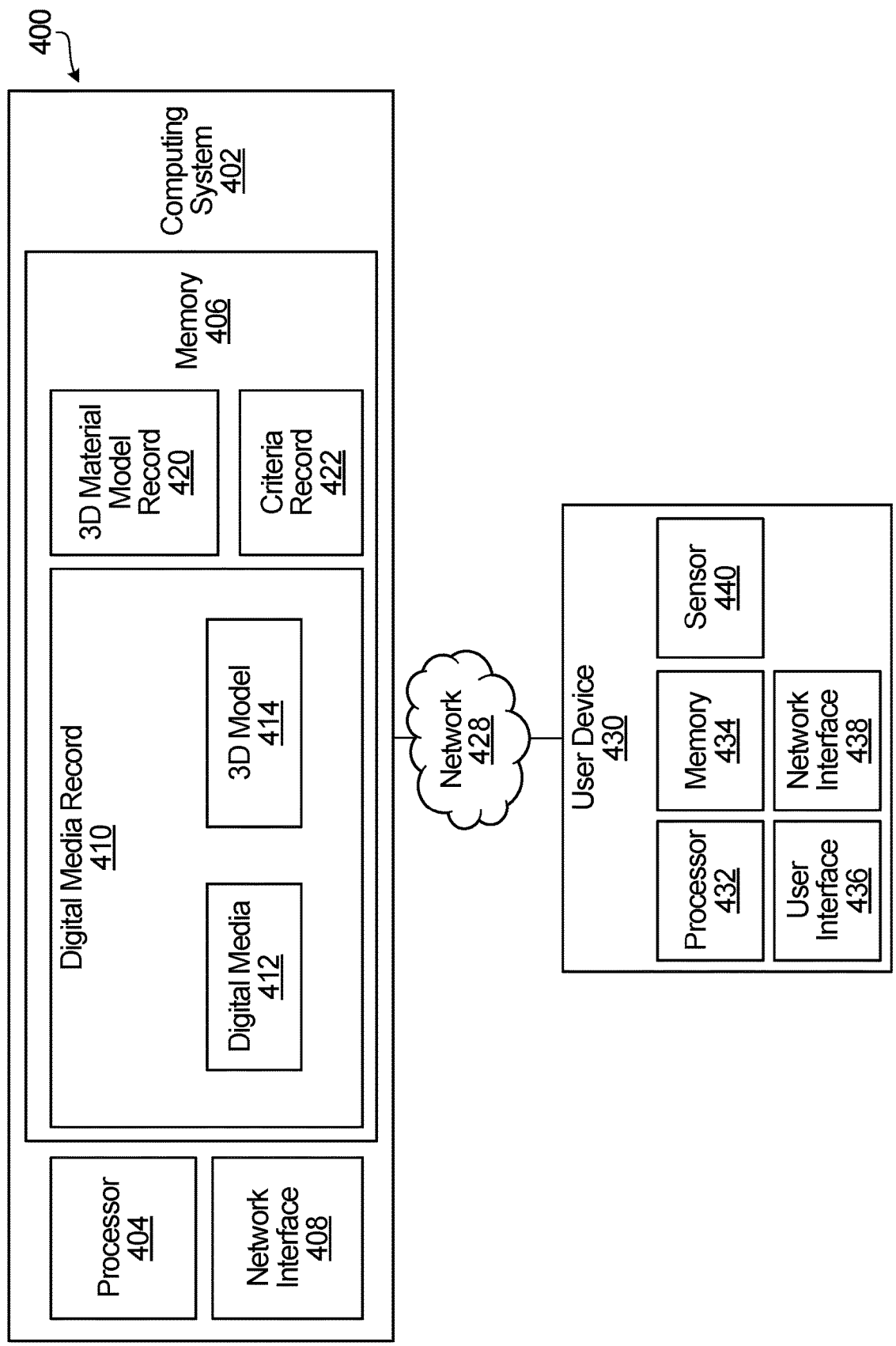
FIG. 6 is a block diagram illustrating a system for supplementing digital media with 3D models, according to an embodiment.

FIG. 6 is a block diagram illustrating a system 400 for supplementing digital media with 3D models, according to an embodiment. The system 400 includes a computing system 402, a network 428 and a user device 430. The system 400 may be used in any of a number of different applications. For example, the computing system 402 may be or include a commerce platform, a medical platform, a social media platform, or a CAD platform.

As illustrated, the computing system 402 includes a processor 404, memory 406 and a network interface 408. The processor 404 may be implemented by one or more processors that execute instructions stored in the memory 406 or in another computer readable medium. Alternatively, some or all of the processor 404 may be implemented using dedicated circuitry, such as an application specific integrated circuit (ASIC), a graphics processing unit (GPU) or a programmed field programmable gate array (FPGA).

The network interface 408 is provided for communication over the network 428. The structure of the network interface 408 is implementation specific. For example, the network interface 408 may include a network interface card (NIC), a computer port (e.g., a physical outlet to which a plug or cable connects), and/or a network socket.

The memory 406 stores a digital media record 410, a 3D material model record 420, and a criteria record 422. The digital media record 410 may include images, videos and/or 3D models representing one or more objects. The digital media record 410 may also include associated audio content and/or haptic content. For example, the digital media record 410 could store sounds made by or otherwise associated with an object and/or haptic feedback that can provide the feel of an object. Digital media from the digital media record 410 may be transmitted to devices for presentation on those devices.

The type of digital media stored in the digital media record 410 may depend on the application of the computing system 402. In one example, the computing system 402 may be or include a commerce platform that supports online stores for merchants, and the digital media record 410 might store product media depicting the products sold via the online stores. A merchant may generate digital media depicting any, one, some, or all of the products sold in their online store and store this digital media in the computing system 402. The computing system 402 might then provide the digital media to customers of the merchant's online store. In another example, the computing system 402 could be or include a computer-aided design (CAD) platform. The digital media record 410 may store design models that may be provided to users of the CAD platform.

As shown, the digital media record 410 includes digital media 412 that depicts an object and a 3D model 414 that depicts a portion or subset of that object. The digital media 412 may be an image, video and/or 3D model of the object, for example. In some implementations, the digital media 412 depicts the entirety of the object, but at a fidelity and/or resolution that might not show the finer details of the object. The limited fidelity and/or resolution of the digital media 412 may reduce the computational demands associated with displaying the digital media 412 on a user device. For example, an image or video of the object may be compressed to a certain resolution. In the case of a 3D model of the object, a texture map may be limited to a certain resolution and/or might not include any 3D information. Further, a mesh of the 3D model may be limited to a certain number of polygons.

The 3D model 414 may provide additional detail for the subset of the object and may be used to supplement the limited detail of the digital media 412. For example, the 3D model 414 may depict the subset of the object using a high-resolution texture map, using a high polygon count and/or using a height map. In this way, the digital media 412 and the 3D model 414 provide a set of digital media that depict the object at various levels of detail. In some implementations, the digital media 412 is the 3D model 300 of FIGS. 1 to 3, and the 3D model 414 is the 3D model 350 of FIGS. 4 and 5.

The 3D model 414 may specifically correspond to the digital media 412 and/or to the object depicted by the digital media 412. For example, the 3D model may represent a unique region of the object (e.g., a unique pattern on a fabric) depicted by the digital media 412, which might not be depicted by other digital media in the digital media record 410. The 3D model 414 may have been generated for the specific purpose of supplementing the digital media 412. Alternatively, the 3D model 414 could be a more general 3D model that may correspond to, and may be used to supplement, multiple instances of digital media. For example, multiple instances of digital media might depict the same object, and the 3D model 414 may be used to supplement each of those instances of digital media.

In some implementations, the digital media record 410 also includes additional 3D models that depict other subsets of the object and may be used to supplement the digital media 412. Further, the digital media record 410 may include additional digital media that depict other objects.

Identifiers may be assigned to different portions of the digital media 412 to delineate different regions of the object depicted by the digital media 412. For example, identifiers may be assigned to the digital media 412 based on the different materials in the object. Any, one, some, or all of these regions of the object may be represented by a different 3D model. In this way, the identifiers may be used to determine which 3D model should be used to depict a particular region of the object. By way of example, one or more of the areas 310, 312, 314, 316 of the texture map 306 for the 3D model 300 may be assigned a respective identifier that corresponds to a detailed 3D model representing that area. The 3D model 350 may correspond to the identifier for the area 310.

Identifiers may be added to the digital media 412 manually and/or automatically. For example, a user could manually select the portions of the digital media 412 that are represented by different 3D models and assign identifiers to each of the portions. Alternatively or additionally, identifiers may be assigned based on pre-existing texture information in the digital media 412. If the digital media 412 is a 3D model with a texture map, then different identifiers may be assigned to each of the different materials defined in the texture map. As an example, the texture map 306 of FIG. 3 may include a first identifier assigned to the areas 310, 314 for the material 320 and a second identifier assigned to the areas 312, 316 for the material 322.

In some implementations, machine learning algorithms and other predictive algorithms can be used to help detect different materials depicted in the digital media 412 and assign identifiers to the digital media 412 based on the detected materials. For example, a training data set may be formed using digital media that depict objects with known materials. A machine learning (ML) model may then be trained using the training data set. Once trained, the ML model may input digital media depicting unidentified materials and output predictions of those materials. The output of the ML model may also identify the different portions of the digital media that depict each of the materials. Non-limiting examples of ML model structures include artificial neural networks, decision trees, support vector machines, Bayesian networks, and genetic algorithms. Non-limiting examples of training methods for an ML model include supervised learning, unsupervised learning, reinforcement learning, self-learning, feature learning, and sparse dictionary learning.

The 3D material model record 420 stored in the memory 406 includes one or more 3D material models that simulate respective materials. A 3D material model is a 3D model that is generated to represent the colors, textures and/or other properties of a particular material. The 3D material model record 420 may provide a universal library of 3D material models that could be implemented to supplement different instances of digital media (e.g., any, some, or all the digital media stored in the digital media record 410). The same 3D material model may be used to represent a particular material shown in multiple instances of digital media, which might depict different objects. In this way, a 3D material model might not correspond to any single instance of digital media or any single object. This may conserve storage resources in the system 400, as only one 3D model might be stored in the memory 406 to represent a material depicted in multiple instances of digital media.

In some implementations, the 3D material model record 420 is used to supplement the digital media 412. When a user zooms in on a region of the digital media 412 that includes a certain material, then a corresponding 3D material model may be obtained from the 3D material model record 420 and be used to provide a detailed representation of that material. The 3D material model record 420 and the 3D model 414 may both be used to supplement the digital media 412 (e.g., the 3D material model record 420 and the 3D model 414 may be used in combination). For example, the 3D material model record 420 may be used to provide detail for materials of the object that are not represented by the 3D model 414. Alternatively, the 3D material model record 420 may be used instead of the 3D model 414. For example, a 3D material model may provide detail for the same subset of the object that is represented by the 3D model 414. In this way, the 3D model 414 could be considered optional.

One example of a 3D material model that could be included in the 3D material model record 420 is the 3D model 350, which simulates the material 320. When a user device zooms in on the exterior sidewall of the object 301 in the 3D model 300, then the 3D model 350 may be obtained from the 3D material model record 420 and rendered to present the exterior surface of the object 301 in greater detail. The 3D model 350 may also be used to supplement other instances of digital media that depict the material 320.

In some implementations, a common set of identifiers may be used to link digital media and 3D material models. For example, the 3D material models in the 3D material model record 420 may be assigned identifiers that correspond to identifiers used to label the digital media in the digital media record 410. When a user zooms in on or otherwise selects a particular material depicted in digital media, then an identifier for the material may be used to determine a corresponding 3D material model that provides a detailed representation of the material. Consider a case in which digital media depicts a leather boot with a wooden sole and fur trim. All of the leather portions of the boot may be assigned an identifier that corresponds to a 3D material model for the leather material. If a user zooms in on any region of the boot with that leather material, then the same 3D material model may be used to depict the leather material with a high degree of detail. This may conserve storage and communication resources at a user device, as only one 3D model needs to be received and stored at the user device for all of the leather portions of the boot. Similar comments may apply to the wooden sole and fur trim of the boot.

The criteria record 422 includes one or more criteria for determining when digital media should be replaced with, or otherwise supplemented by, a 3D model. The criteria may be defined to help ensure that an object and/or any region thereof is depicted with a target quality on a user device. The target quality may also be referred to as a "desired quality" or an "intended quality". The target quality may be based on a clarity (e.g., pixilation or blurriness) and/or a level of detail for the object. In some implementations, the target quality is defined based on one or more digital media attributes, including sharpness, noise and contrast, for example. If digital media depicting an object can achieve a target quality at a certain level of zoom, then the digital media may be displayed on a user device. However, if the digital media fails to achieve the target quality at a higher level of zoom, then the digital media might be supplemented with a 3D model representing the region to achieve the target quality.

Non-limiting examples of different types of criteria for determining when digital media should be replaced with, or otherwise supplemented by, a detailed 3D model include:

- A minimum resolution or a threshold resolution for depicting a region of an object. Digital media that is not able to provide the minimum resolution for a selected region of an object may fail to meet this criterion. The minimum resolution may be defined in terms of a minimum number of pixels and/or a minimum pixel density that an image, video or render of a 3D model should provide to depict a region of an object with a target quality. For example, the number of pixels being displayed on a user device may be monitored as a user zooms in on digital media. If the digital media cannot provide the minimum number of pixels for a region of the object at a certain level of zoom, then it may be determined that the digital media should be replaced with a 3D model.
- A minimum fidelity or a threshold fidelity for depicting a region of an object. The minimum fidelity may include a minimum resolution and may also or instead include other metrics of how accurately the region of the object is depicted. For example, in the case of a 3D model representing an object, the minimum fidelity may include a minimum number of polygons shown in a render of the 3D model. Alternatively or additionally, the minimum fidelity may require that a height map (e.g., a bump map) be included in the 3D model to better represent surface texture.
- A maximum level of zoom or a maximum magnification for digital media. The last level of zoom at which digital media can depict an object with a target quality may be considered the maximum level of zoom for the digital media. This maximum level of zoom may be expressed in terms of a percentage or ratio. For example, the maximum level of zoom may be 300% for digital media, which triples the size of a portion of the digital media from the perspective of a user. Any level of zoom that exceeds 300% might trigger the replacement of the digital media with a 3D model.

The criteria record 422 may include universal criteria that could apply broadly to multiple instances of digital media and/or include media-specific criteria that might apply only to certain instances of digital media. Universal criteria may be defined by the computing system 402 and apply to the entire digital media record 410. Any instance of digital media in the digital media record 410 may be supplemented with a 3D model when a universal criterion is not met. On the other hand, media-specific criteria may be user-defined. For example, consider the case in which the digital media record 410 includes product media for display on a merchant's online store. The merchant may define criteria for any, one, some, or all of their product media. The product media may be supplemented by a 3D model whenever a merchant-defined criterion is met (or not met).

The network 428 in the system 400 may be a computer network implementing wired and/or wireless connections between different devices, including the computing system 402 and the user device 430. For example, the computing system 402 may receive digital media from the user device 430 and/or send digital media to the user device 430 via the network 428. The network 428 may implement any communication protocol known in the art. Non-limiting examples of communication protocols include a local area network (LAN), a wireless LAN, an internet protocol (IP) network, and a cellular network.

The user device 430 may be or include a mobile phone, tablet, laptop, projector, headset and/or computer. The user device 430 includes a processor 432, memory 434, user interface 436, network interface 438 and sensor 440. The user interface 436 may include, for example, a display screen (which may be a touch screen), a gesture recognition system, a speaker, headphones, a microphone, haptics, a keyboard, and/or a mouse. The user interface 436 may present digital content to a user, including visual, haptic and audio content. In some implementations, the user device 430 includes implanted devices or wearable devices, such as a device embedded in clothing material, or a device that is worn by a user, such as glasses.

The network interface 438 is provided for communicating over the network 428. The structure of the network interface 438 will depend on how the user device 430 interfaces with the network 428. For example, if the user device 430 is a mobile phone, headset or tablet, then the network interface 438 may include a transmitter/receiver with an antenna to send and receive wireless transmissions to/from the network 428. If the user device is a personal computer connected to the network 428 with a network cable, then the network interface 438 may include, for example, a NIC, a computer port, and/or a network socket.

The processor 432 directly performs or instructs all of the operations performed by the user device 430. Examples of these operations include processing user inputs received from the user interface 436, preparing information for transmission over the network 428, processing data received over the network 428, and instructing a display screen to display information. The processor 432 may be implemented by one or more processors that execute instructions stored in the memory 434. Alternatively, some or all of the processor 432 may be implemented using dedicated circuitry, such as an ASIC, a GPU or an FPGA.

The sensor 440 may enable photography, videography, distance measurements, 3D scanning and/or 3D mapping (e.g., simultaneous localization and mapping (SLAM)) at the user device 430. For example, the sensor 440 may include one or more cameras, radar sensors, lidar sensors, sonar sensors, accelerometers, gyroscopes, magnetometers and/or satellite positioning system receivers (e.g., global positioning system (GPS) receivers). Measurements obtained by the sensor 440 may help to enable augmented reality (AR), mixed reality (MR) and/or extended reality (XR) experiences on the user device 430. Although the sensor 440 is shown as a component of the user device 430, at least a portion of the sensor 440 may also or instead be implemented separately from the user device 430 and may communicate with the user device 430 via wired and/or wireless connections, for example.

Figure 7:
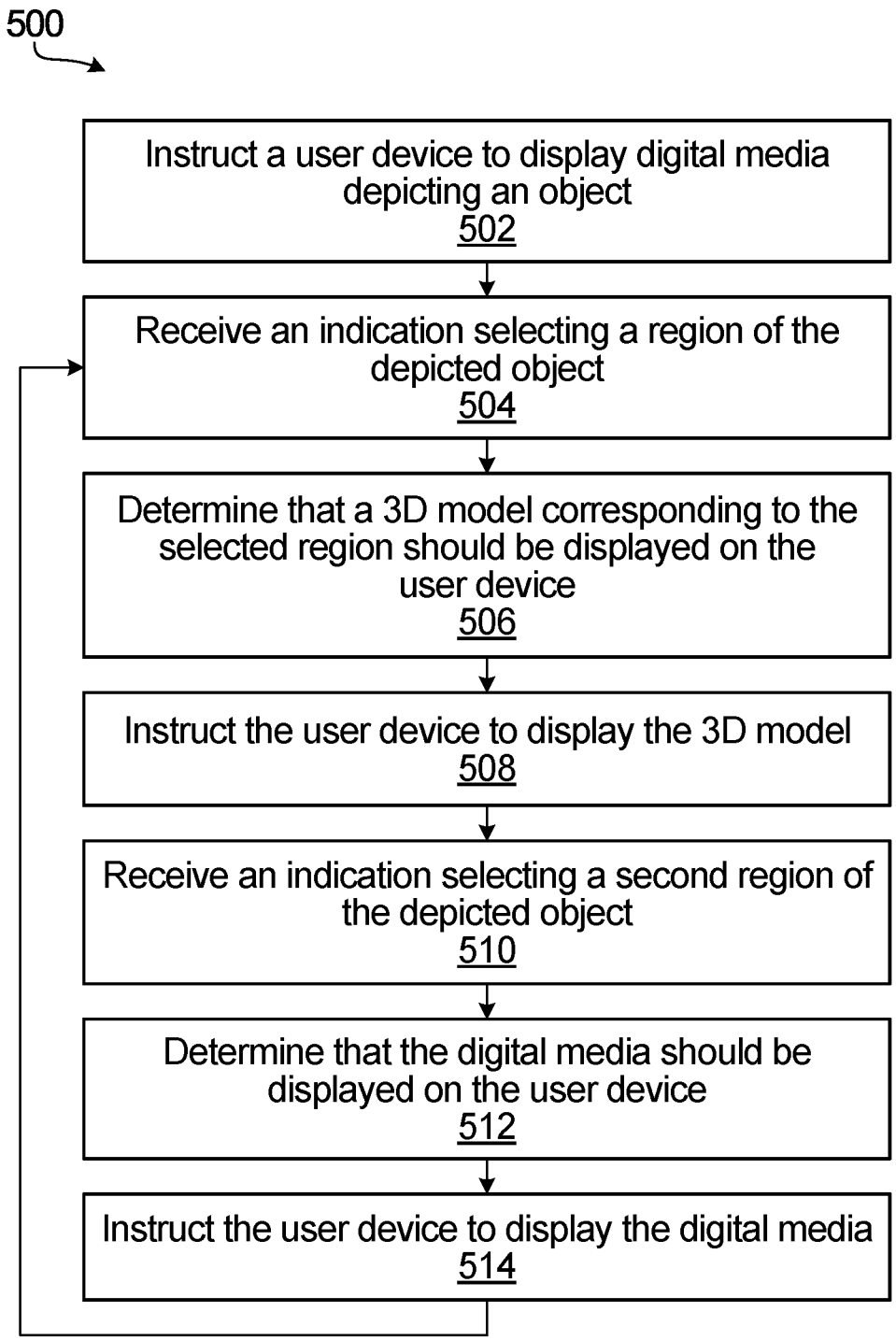
FIG. 7 is a flow diagram illustrating a method for supplementing digital media using a 3D model, according to an embodiment.

FIG. 7 is a flow diagram illustrating a method 500 for supplementing digital media using a 3D model, according to an embodiment. The method 500 will be described as being performed by the computing system 402 of FIG. 4 to supplement the digital media 412 being displayed at the user device 430. For example, the memory 406 may store instructions which, when executed by the processor 404, cause the processor 404 to perform the method 500. However, this is only one example implementation of the method 500. The method 500 may be more generally applied to supplement other instances of digital media displayed at other devices. The method 500 also need not always be performed by the computing system 402 and might instead be performed by another device, such as the user device 430, for example.

Step 502 includes the processor 404 instructing the user device 430 to display the digital media 412. This may result in at least a portion of the object depicted by the digital media 412 being shown on a display screen of the user device 430. As noted above, the digital media 412 may include an image and/or a video of the object that could be presented on the display screen of the user device 430. Alternatively or additionally, the digital media 412 may include a 3D model of the object, in which case one or more renders of the 3D model may be presented on the display screen of the user device 430. The renders of the 3D model may be generated locally at the user device 430.

In some implementations, step 502 includes transmitting the digital media 412 to the user device 430. However, this need not always be the case. The digital media 412 might instead be already stored in the memory 434 on the user device 430. The instructions to display the digital media 412 on the user device 430 may be transmitted to the user device 430 from the computing system 402. For example, instructions may be sent to the user device 430 in the form of a hypertext markup language (HTML) page.

In some implementations, a user may interact with the digital media 412 at the user device 430. For example, the user may zoom in on different regions of the object and/or pan between regions of the object. If the digital media is a 3D model of the object, then the user may move and/or rotate the object within a virtual coordinate system. Optionally, the 3D model may be placed within an AR, MR or XR experience being implemented by the user device 430.

Step 504 includes the processor 404 receiving an indication selecting a region of the depicted object in the digital media 412. This indication may be generated at the user device 430 and transmitted to the computing system 402. In some implementations, the indication is based on user input at the user device 430. For example, the indication may be based on a user magnifying a portion of the digital media 412 to enlarge the selected region of the object on a display screen of the user device 430. Magnifying the digital media 412 may include zooming in on a portion of an image, a frame of a video, and/or a render of a 3D model. After magnifying the portion of the digital media 412, the selected region of the object may substantially fill the display screen of the user device 430. In another example, the indication may be based on a user manually selecting the region of the object in a display screen of the user device 430 using a click on a computer mouse or a tap on a touchscreen. In yet another example, the indication may be based on a user drawing a perimeter around the selected region using a computer mouse or a touchscreen.

Other types of indications selecting a region of the depicted object in the digital media 412 are also contemplated. For example, as noted above, the digital media 412 may be a 3D model that is implemented within an AR experience at the user device 430. Renders of the 3D model may be overlaid with an image of a real-world environment captured by a camera in the user device 430, such that the object appears to be present within that real-world environment. Renders of the 3D model may also or instead be presented on a transparent display of the user device 430 to overlay the renders with the real-world environment. An indication selecting a region of the object may then be based on a user physically bringing the user device 430 closer to the region of the object within the AR experience. For example, by moving the user device 430 within the real-world environment, the user device 430 may magnify the selected region of the object depicted on the user device 430. In this way, a user physically moving the user device 430 in an AR experience may provide an indication selecting a region of the object.

It should be noted that a selected region of an object is not limited to a 2D region. For example, the selected region may be a 3D surface of an object represented by a 3D model.

As noted above, the fidelity of the digital media 412 may be limited to reduce the computational demands associated with displaying the digital media 412 on the user device 430 and other devices. The limited fidelity of the digital media 412 may result in situations where the digital media 412 lacks the detail to accurately depict the selected region of the object indicated in step 504. For example, the digital media 412 might only be able to provide a pixelated or blurry representation of the selected region.

Step 506 is an optional step that includes the processor 404 determining or predicting, based on at least one criterion and the selected region indicated in step 504, that a 3D model should be displayed on the user device 430. This 3D model may correspond to the selected region of the depicted object and may be different from the digital media 412. The criterion used in step 506 may be obtained from the criteria record 422, for example. The criterion may be specific to the digital media 412 or may be a universal criterion that could be applied to multiple instances of digital media. In some implementations, the criterion includes a minimum fidelity and/or a minimum resolution for depicting the selected region with a target quality. If the digital media 412 cannot provide this minimum fidelity and/or minimum resolution for the selected region, then the processor 404 may determine that the 3D model should be displayed on the user device 430. Alternatively or additionally, the criterion may include a maximum zoom level for depicting the selected region with a target quality. For example, this may be the highest zoom level achievable by the digital media 412 while still providing a clear representation of the object. If the zoom level associated with the selected region of the object exceeds the maximum zoom level (e.g., the user has requested a zoom level that is greater than the maximum zoom level), then the processor 404 may determine that the 3D model should be displayed on the user device 430.

In some implementations, a target quality is compared to an achievable quality that could be produced after zooming in on, scaling or otherwise magnifying the selected region of the object in the digital media 412. The achievable quality may relate to the resolution and/or fidelity of the portion of the digital media 412 that represents the selected region of the object. The achievable quality may also or instead relate to the zoom level at which the digital media 412 represents the selected region of the object. If the target quality is greater than the achievable quality, then it may be determined that a 3D model should be displayed on the user device 430. For example, the target quality may be greater than what the digital media 412 can yield after zooming in on the selected region of the object. Alternatively, if the target quality is less than this achievable quality, then it may be determined that the digital media 412 should be displayed on the user device 430.

Step 508 includes the processor 404 instructing the user device 430 to display the 3D model corresponding to the selected region of the object. This instruction may be transmitted to the user device 430 from the computing system 402. In some implementations, step 508 includes transmitting the 3D model to the user device 430. Alternatively, the 3D model may be already stored in the memory 434 on the user device 430. Optionally, the 3D model may be placed within an AR, MR or XR experience being implemented by the user device 430.

The 3D model might be limited to representing a subset of the object that includes the selected region and might depict the selected region with a fidelity and/or resolution that is significantly higher than that of the digital media 412. In this way, renders of the 3D model may depict the selected region with a high degree of detail while still conserving computational resources at the user device 430. For example, the 3D model may include a high-resolution texture map, a dense mesh and/or a height map (e.g., a bump map) that better illustrate texture and/or surface imperfections of the selected region of the object. In some implementations, the 3D model could have a simple geometric shape (e.g., spherical or cubic), which may help reduce computation and storage requirements for the model. A detailed 3D texture may then be added to the 3D model using a height map, for example.

In some implementations, step 508 includes selecting a 3D model that corresponds to the selected region of the object and that should be displayed on the user device 430. This selection may be performed, at least in part, using identifiers that are assigned to different portions of the digital media 412. For example, the digital media 412 may include multiple identifiers that correspond to respective regions of the object. One or more 3D models that are stored in the digital media record 410, in the 3D material model record 420 and/or elsewhere may also be assigned identifiers that correspond to the identifiers in the digital media 412. Step 508 may include determining a particular identifier that corresponds to the selected region of the object and selecting the 3D model based on the particular identifier by comparing the particular identifier to the identifiers assigned to the 3D models. By way of example, the particular identifier of the selected region may match the identifier assigned to the 3D model 414 in the digital media record 410. The 3D model 414 might then be displayed on the user device 430 following step 508. As noted above, the 3D model 414 may be specific to the digital media 412 and/or be specific to the object depicted by the digital media 412. For example, the 3D model 414 may be used to represent a unique feature of the object.

In some implementations, the particular identifier of the selected region corresponds to a particular material in the object. The 3D model displayed on the user device 430 following step 508 might then include a 3D representation of the particular material. For example, the 3D model may be a 3D material model selected from the 3D material model record 420 based on the particular identifier.

In some implementations, step 508 is performed responsive to determining that the 3D model should be displayed on the user device 430 in step 506. However, this might not always be the case. For example, step 508 might also or instead be performed responsive to a user request for a 3D model to be displayed on the user device 430. The user might request that a selected region of the object be represented using a 3D model, and step 508 may be performed to display that 3D model. In some implementations, a "material viewer" option may be presented on a display of the user device 430. When the material viewer option is selected, the user device 430 may display a 3D material model corresponding to a selected region.

In some implementations, step 508 includes instructing the user device 430 to replace the digital media 412 with the 3D model on a display of the user device 430. After the replacement, the digital media 412 might no longer be displayed on the user device 430. The replacement of the digital media 412 with the 3D model could be performed such that it is relatively imperceptible to a user. For example, after it is determined or predicted that the digital media 412 should be replaced with the 3D model in step 506, the 3D model could be loaded in the memory 434 of the user device 430. When the user zooms in to the selected region of the object (e.g., the user exceeds the digital media's maximum level of zoom), the 3D model may be rendered to depict the selected region, and the digital media 412 may be replaced with the render in a relatively seamless manner.

However, the digital media 412 might not be replaced with the 3D model in all implementations. Renders of the 3D model might instead be presented alongside the digital media 412 in a display of the user device 430. For example, the digital media 412 may be presented in one window of the display and the 3D model may be presented in another window of the display (e.g., in a material viewer window).

An initial render of the 3D model may be generated based on the digital media 412 to provide a view of the object that matches the view previously provided by the digital media 412. For example, a render of the 3D model may reflect the size and orientation of the selected region of the object as depicted in the digital media 412. The digital media 412 may then be replaced with the render of the 3D model in a substantially seamless manner. After the replacement, the user may begin viewing and interacting with the 3D model. For example, the user may magnify and/or manipulate (e.g., move and rotate) the 3D model to obtain different views of the object. The user may zoom in on the 3D texture provided by the 3D model to better appreciate the look and even the feel of the selected region of the object.

In some implementations, the 3D model could be modified to better match the digital media 412 and possibly provide a more seamless replacement of the digital media 412. The modification may include modifying the computer-graphics lighting in the 3D model. For example, step 508 may include determining the lighting of the selected region of the object as depicted in the digital media 412, which may characterize illumination of the selected region in the digital media 412. Step 508 may then include applying the determined lighting to the 3D model. Once the lighting is applied to the 3D model, the selected region of the object may be lit similarly in both the digital media 412 and the 3D model. The similar lighting may help avoid any abrupt or jarring changes in object appearance when the digital media 412 is replaced with a render of the 3D model on a display screen of the user device 430, for example. Furthermore, in some cases, the lighting depicted in the digital media 412 might be associated with the user of the user device 430 (e.g., be selected and/or provided by the user) and could be applied to the 3D model so that the lighting remains relevant to the user. For example, the lighting depicted in the digital media 412 may correspond to the lighting in a room of the user's home. Alternatively or additionally, if the digital media 412 is implemented in an AR experience on the user device 430, then step 508 may include determining the lighting in the real-world environment for that AR experience and applying the real-world lighting to the 3D model to provide a more immersive AR experience.

The lighting depicted in the digital media 412 may be determined in the form of an environment map. This environment map may be generated by performing image analysis on the digital media 412. For example, background content depicted in the digital media 412 may be extracted and stitched together to form an environment map, which may at least partially recreate the environment or scene in which the digital media 412 was generated. Alternatively or additionally, the light interactions shown on the surfaces of the object in the digital media 412 and knowledge of the object's material properties may be used to help determine at least a portion of the environment map (e.g., locate blobs of light and/or dark areas in the environment based on light interactions on the object). Alternatively or additionally, an environment map for the digital media 412 may be created in a mapping process and optionally stored as metadata with the digital media 412. The position of the object within the environment map for the digital media 412 may be determined and stored as coordinates. For example, a coordinate system may be mapped to the environment map, and the object may be assigned a position and orientation within the coordinate system. The environment map for the digital media 412 may be used to apply lighting to the 3D model by placing the environment map within a virtual coordinate system of the 3D model. The lighting captured by the environment map may be projected onto the virtual surfaces of the 3D model using image-based lighting techniques, for example. The environment map may also enable the depiction of reflections (e.g., through reflection mapping) on the virtual surfaces of the 3D model.

Alternatively or additionally, the lighting depicted in the digital media 412 may be determined in the form of properties of one or more light sources. The properties of a light source depicted in the digital media 412 may include, inter alia, the brightness or intensity of the light source (e.g., in lumens), the color of the light source (e.g., in terms of the red-green-blue (RGB) color model or in terms of color temperature in Kelvin), the location of the light source (e.g., the coordinates of the light source), the directionality of the light source, the spread of the light source, and the type of light source. Examples of different types of light sources include point light sources that emit light in all directions from a single location (e.g., a standalone light bulb), directional light sources that uniformly emit light in one direction (e.g., sunlight), spotlights that produce a cone of light (e.g., a flashlight) and ambient light that produces general illumination with no directionality (e.g., light reflected from multiple surfaces in a room). In some implementations, the light interactions depicted on the selected region of the object in the digital media 412 may be analyzed to determine the light sources that may have produced those interactions. For example, the diffuse, ambient and/or specular light interactions shown on the object in the digital media 412 may be used to determine the properties of light sources. If the material of the selected region of the object is known (e.g., based on an identifier in the digital media 412), then the material properties of the selected region of the object may be used to help characterize the corresponding light sources. For example, the light interactions may be extracted from the digital media 412 through image analysis and be compared to the material properties to determine which light sources may have produced those light interactions. Light interactions depicted on background objects in the digital media 412 may also or instead be used to determine the properties of light sources. Once the properties of the light sources depicted in the digital media 412 are determined, virtual light sources may be added to the 3D model based on those properties. This may provide similar lighting of the selected region in the digital media 412 and in the 3D model.

Following step 508, the user device 430 may switch back to displaying the digital media 412 at some point. Step 510 is an optional step that includes the processor 404 receiving a further indication selecting a second region of the depicted object. Similar to the indication received in step 504, this further indication may be received from the user device 430 and/or may be based on user input at the user device 430. For example, the indication may be based on a user zooming out from the first selected region of the object represented by the 3D model to the second selected region. In another example, the indication may be based on a user closing a material viewer window on the user device. Step 512 is an optional step that includes the processor 404 determining, based on at least one criterion and the second selected region, that the digital media 412 should be displayed on the user device 430. The at least one criterion used in step 512 may be the same criterion used in step 506. For example, if the digital media 412 can provide a minimum fidelity and/or a minimum resolution for depicting the second selected region with a target quality, then the processor 404 may determine that the digital media 412 should be displayed. Alternatively or additionally, it may be determined that a zoom level associated with the second region of the object is less than a maximum zoom level for the digital media 412. Step 514 is an optional step that includes the processor 404 instructing the user device 430 to display the digital media 412, which may be performed responsive to the determining in step 512. Step 514 might not include transmitting the digital media 412 to the user device 430, as the digital media 412 may already be stored in the memory 434.

In the case that the digital media 412 includes a 3D model of the object, then this 3D model may be rendered in step 514 based on the viewpoint of the object displayed on the user device 430 immediately before step 508 was performed. For example, any changes to the orientation of the object made after step 508 using the 3D model of the first selected region may be ignored when switching back to viewing the digital media 412. Alternatively, the 3D model may be rendered based on the viewpoint of the object displayed on the user device 430 immediately before step 514 was performed. Rendering the 3D model in the digital media 412 based on the user's view of the object immediately before step 514 may preserve the changes made to a user's view of the object when viewing the 3D model of the first selected region.

As illustrated using the arrow from step 514 to 504, at least a portion of the method 500 may be performed multiple times. This may allow a user to zoom in on and out of various regions of the object depicted by the digital media 412, resulting in multiple occurrences of replacing the digital media 412 with one or more 3D models that represent different subsets (e.g., different materials) of the object. The replacing may be performed such that, from the perspective of the user, they appear to be viewing a single high-fidelity instance of digital media (e.g., a single high-fidelity 3D model) that depicts the object with a high level of detail.

The orders of the steps 502, 504, 506, 508, 510, 512, 514 shown in FIG. 7 are provided by way of example. Other orders of these steps are contemplated. In some implementations, step 506 could be performed before step 504. The computing system 402 might determine or predict that a 3D model should be displayed on the user device 430 in step 506 before a user actually selects the region that the 3D model corresponds to. For example, the user may be quickly zooming in on the digital media 412, and it may be predicted that the user intends to view a region of the object that cannot be depicted by the digital media 412 at a target quality. In this way, the selection of the region by the user may be anticipated. The 3D model may be loaded into the memory 434 of the user device 430 while the user is zooming in on the digital media 412, which may be considered a form of buffering the next level of zoom for the digital media 412. This may reduce a delay associated with replacing the digital media 412 with the 3D model in a display screen of the user device 430 and potentially provide a more seamless experience for the user.

Other implementations of the method 500 are also contemplated. For example, the method 500 may be performed in whole or in part by the user device 430. The user device 430 may store the digital media 412 and the 3D model and may also instruct the display of the digital media 412 and the 3D model in steps 508, 514.

FURTHER EXAMPLES

Figure 8:
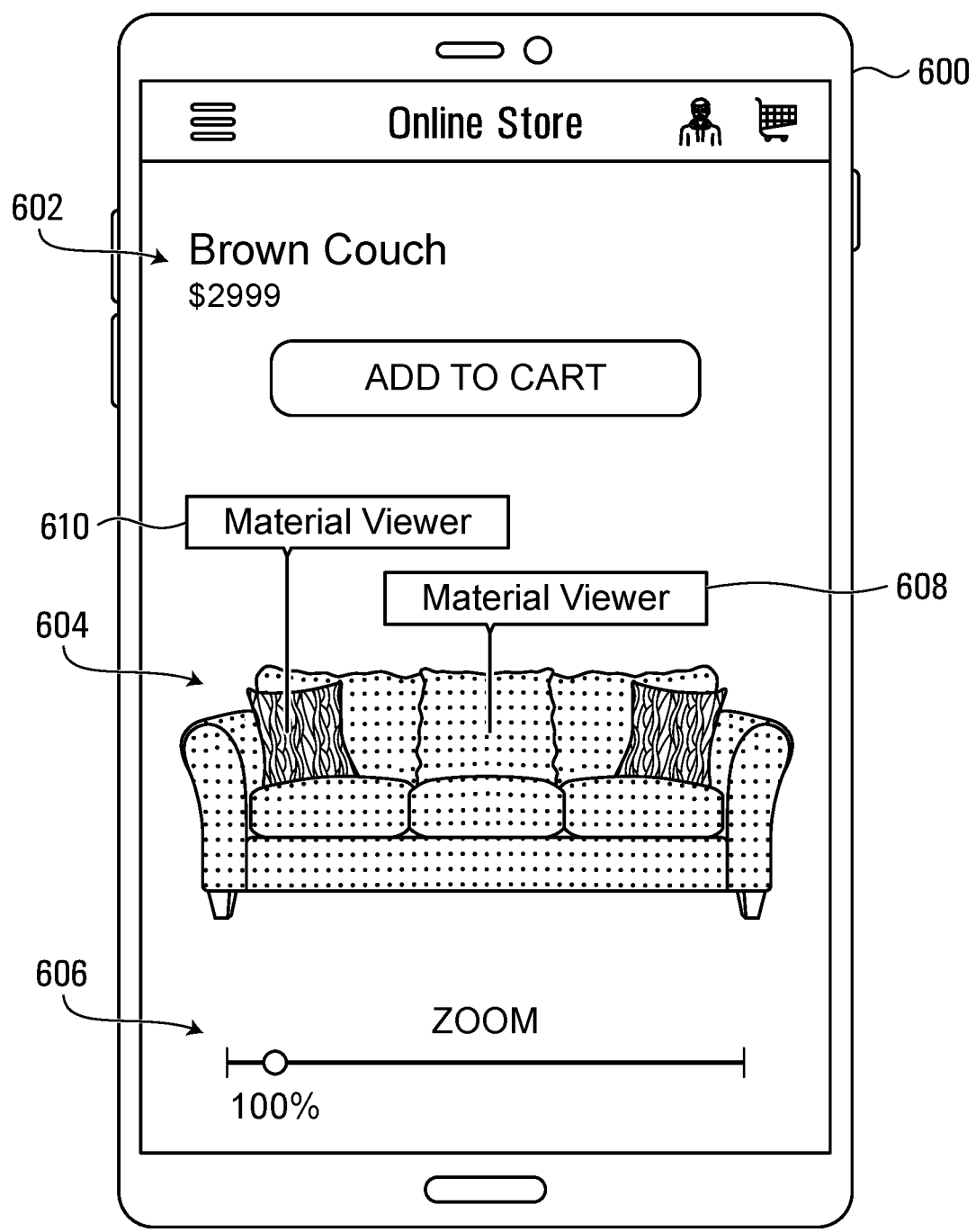
FIG. 8 illustrates a user device displaying a screen page of an online store including digital media providing a depiction of a couch.

FIGS. 8 to 12 illustrate examples of supplementing digital media with 3D models in an e-commerce setting. FIG. 8 illustrates a user device 600 displaying a screen page 602 of an online store. The screen page 602 is a product page of the online store that offers a couch for sale. The screen page 602 displays digital media providing a depiction 604 of the couch. For example, the digital media may be an image of the couch, a video of the couch or a 3D model of the couch. If the digital media is an image, then the depiction 604 may be at least a portion of that image. If the digital media is a video, then the depiction 604 may be a frame of the video. If the digital media is a 3D model, then the depiction may be a render of the 3D model. The screen page 602 also includes an indication 606 that the depiction 604 corresponds to a 100% zoom level for the digital media (i.e., the digital media has not been magnified). The screen page 602 further includes an option 608 to open a material viewer for the fabric used in the cushions of the couch and another option 610 to open a material viewer for the fabric used in the pillows of the couch.

The screen page 602 provides an example implementation of step 502 of the method 500. For example, the user device 600 may be instructed to display the digital media depicting the couch by a computing system that implements the online store. As shown, the digital media may be initially provided without any magnification such that the entire couch is visible on the user device 600. The user may then be able to adjust the magnification of the digital media to zoom in on certain regions or materials of the couch. In the case that the digital media is a 3D model of the couch, the user may also be able to virtually move and/or rotate the couch within the display of the user device 600 to view different regions of the couch.

Figure 9:
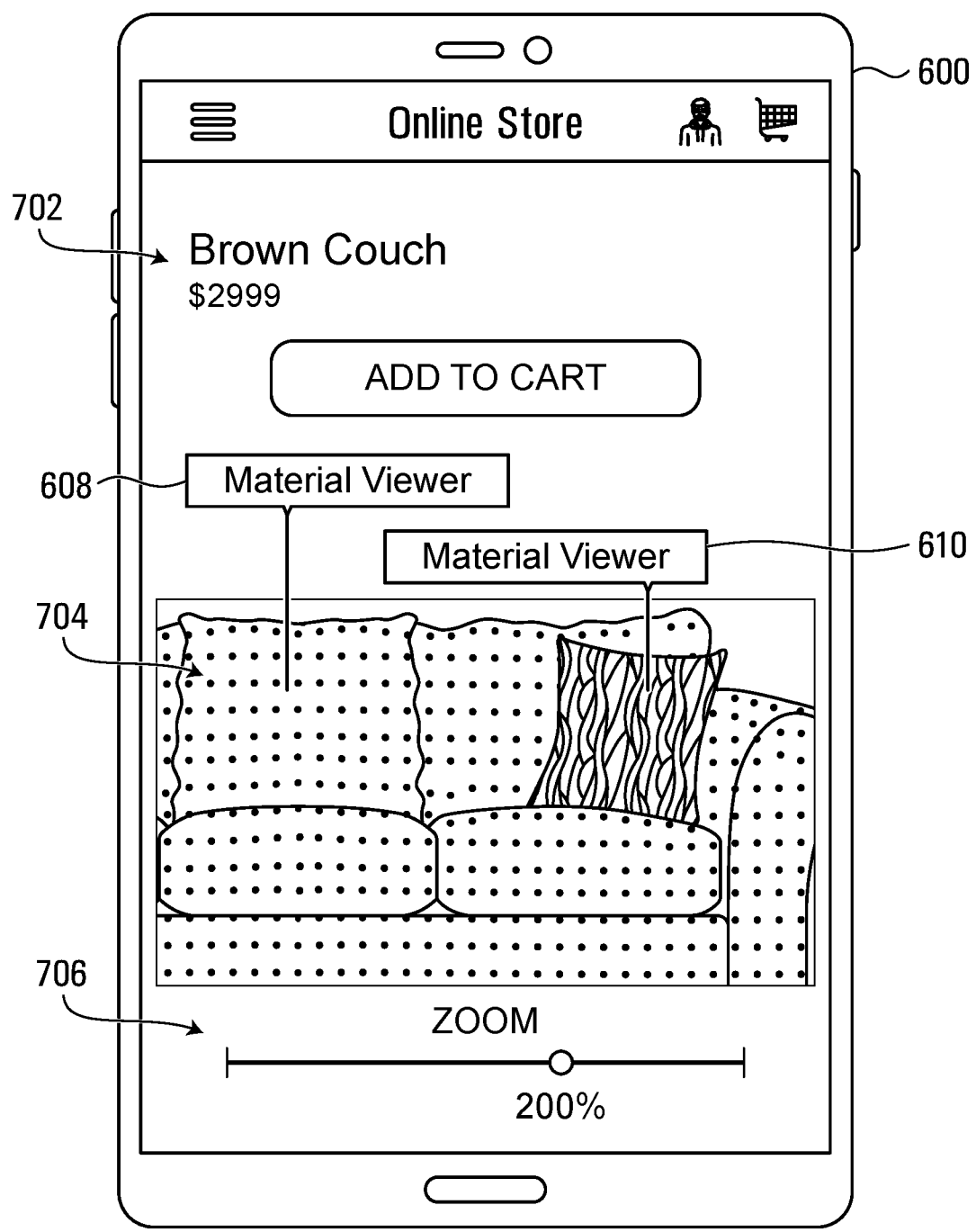
FIG. 9 illustrates the user device of FIG. 8 displaying another screen page of the online store after magnifying the digital media depicting the couch.

FIG. 9 illustrates the user device 600 displaying another screen page 702 of the online store after magnifying the digital media depicting the couch. The screen page 702 includes a depiction 704 of a selected region of the couch and an indication 706 that the depiction 704 corresponds to a 200% zoom level in the digital media. The screen page 702 may have been generated in response to user input at the user device 600 that zooms in on the digital media depicting the couch.

In this example, the digital media is able to depict the couch at a target quality at the 200% zoom level. For example, the resolution of the depiction 704 may be greater than a minimum resolution, the fidelity of the depiction 704 may be greater than a minimum fidelity, and/or the maximum zoom level of the digital media may be greater than 200%. However, the digital media may be supplemented with a 3D model if a user zooms in on the digital media to a level at which the digital media cannot depict the couch with a target quality. For example, the fidelity and/or resolution of the digital media may be limited to help ensure smooth operation on the user device 600. Alternatively or additionally, the digital media may be supplemented with a 3D model if a user selects either of the options 608, 610.

Figure 10:
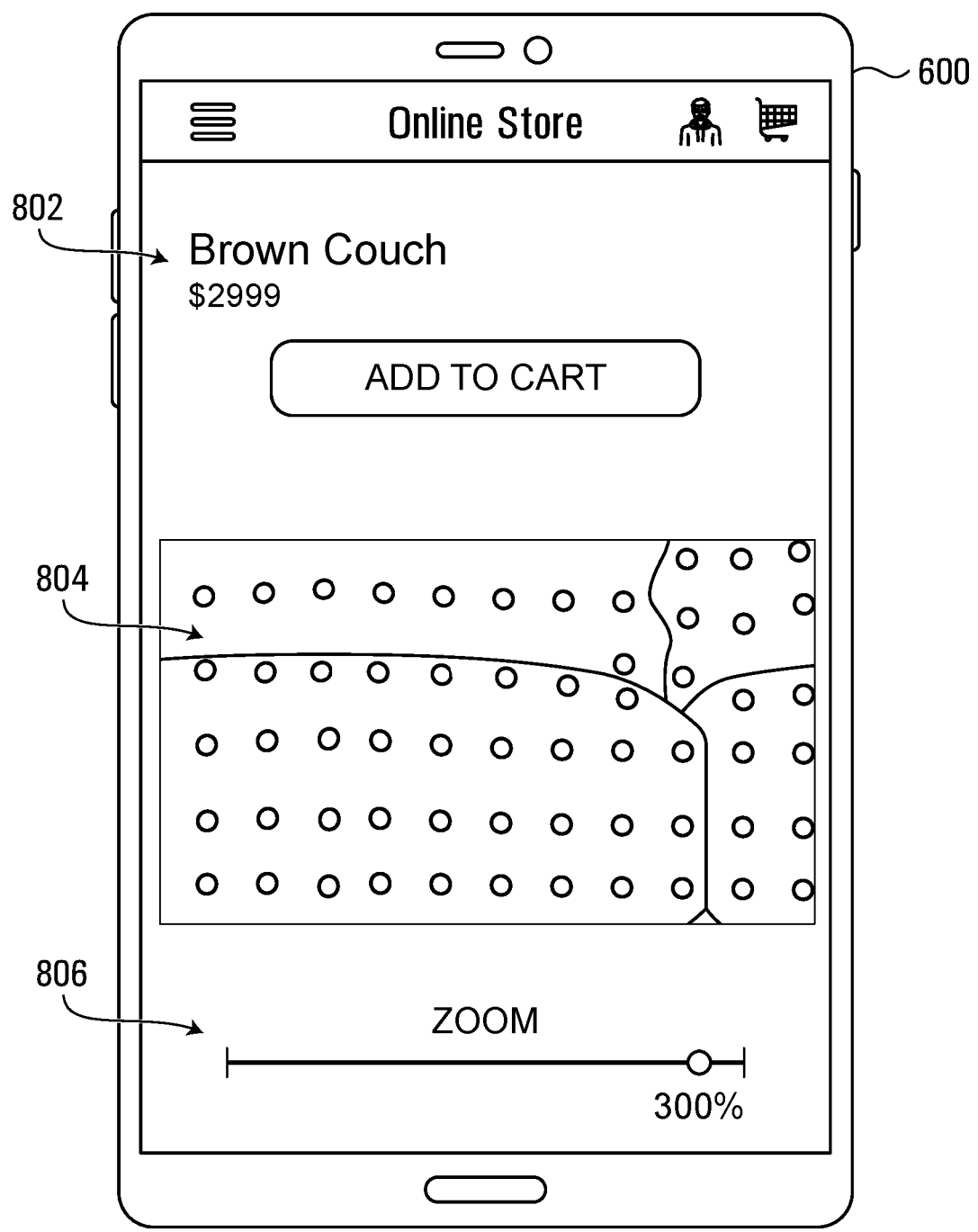
FIG. 10 illustrates the user device of FIG. 8 displaying yet another screen page of the online store, but with the digital media replaced with a render of a 3D model corresponding to a cushion of the couch.

FIG. 10 illustrates the user device 600 displaying another screen page 802 of the online store, but with the digital media replaced with a 3D model corresponding to the cushions of the couch. The screen page 802 includes a render 804 of the 3D model that shows the couch cushions at a high level of detail. The render 804 may correspond to the size and orientation of a selected region of the couch (e.g., a region selected via user input at the user device 600). The screen page 802 further includes an indication 806 that the render 804 corresponds to a 300% zoom level in the digital media.

The 3D model of the couch cushions provides a detailed 3D representation of the fabric used in the couch cushions. The 3D model may include a high-resolution texture map, a dense mesh and/or a height map, for example. The 3D model may have been modified based on lighting shown in the digital media in order to provide a more seamless transition between the digital media and the 3D model. While the 3D model may provide a high-fidelity representation of the couch cushions, the 3D model might not be computationally demanding to implement on the user device 600 by virtue of the 3D model being limited to representing the couch cushions (i.e., a subset of the couch), rather than the entire couch.

The screen page 802 provides an example implementation of steps 504, 506, 508 of the method 500. For example, the render 804 may correspond to a selected region of the couch indicated in step 504. User input at the user device 600 may have selected this region of the couch by zooming in on the couch cushion to a 300% zoom level or by selecting the option 608 to open the material viewer for the couch cushion. In step 506, it may be determined that the 3D model corresponding to the couch cushions should be displayed on the user device 600, which may be based on one or more criteria. For example, it may be determined that the digital media cannot depict the couch cushions with a minimum fidelity and/or a minimum resolution. It may also or instead be determined that the 300% zoom level exceeds the digital media's maximum zoom level. Accordingly, in step 508, the user device may be instructed to replace the digital media with the render 804 of the 3D model.

In some implementations, steps 510, 512, 514 of the method 500 may be performed to replace the 3D model of the couch cushions with the digital media depicting the entire couch. For example, step 510 may include receiving an indication of a user zooming out from the render 804 of the 3D model and/or closing the material viewer for the couch cushions. It may then be determined that the digital media should be displayed on the user device 600 in step 512. The user device 600 could be instructed to display the digital media depicting the couch in step 514. For example, the user device 600 might be instructed to display the screen page 702 shown in FIG. 9, which includes the depiction 704 of the couch.

Figure 11:
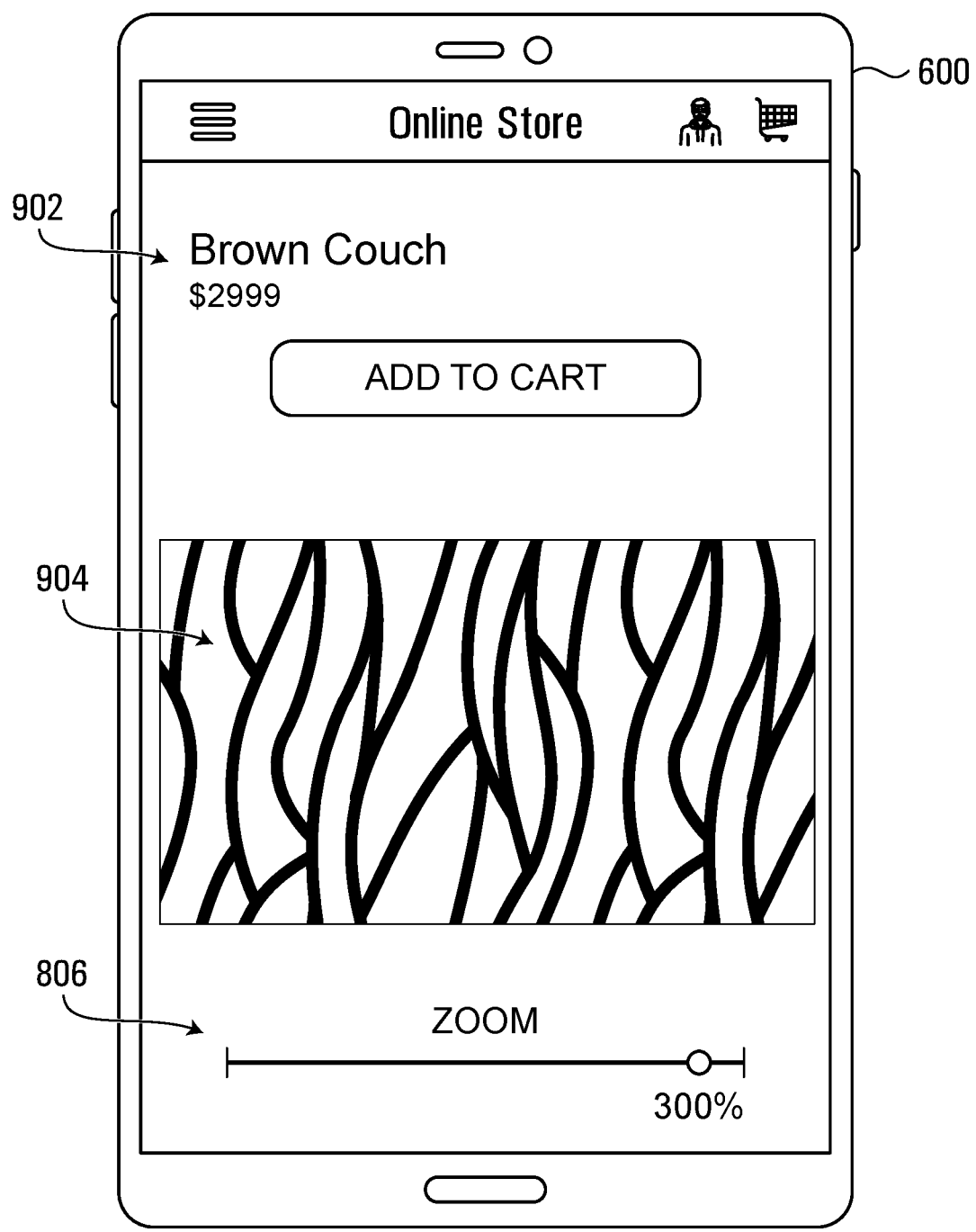
FIGS. 11 and 12 illustrate the user device of FIG. 8 displaying further screen pages of the online store, but with the digital media replaced with renders of a 3D model corresponding to a pillow of the couch.

After the user device 600 returns to displaying the digital media depicting the couch, the user may select another region of the couch to view in greater detail. FIG. 11 illustrates the user device 600 displaying yet another screen page 902 of the online store including a render 904 of a 3D model corresponding to a pillow of the couch. The 3D model of the couch pillow provides a detailed 3D representation of the fabric used in the couch pillow. For example, this 3D model may be a 3D material model for the fabric in the couch pillow. The digital media may have been replaced by the render 904 in response to the user zooming in on the pillow and/or in response to the user selecting the option 610 to open the material viewer for the fabric used in the pillow.

Figure 12:
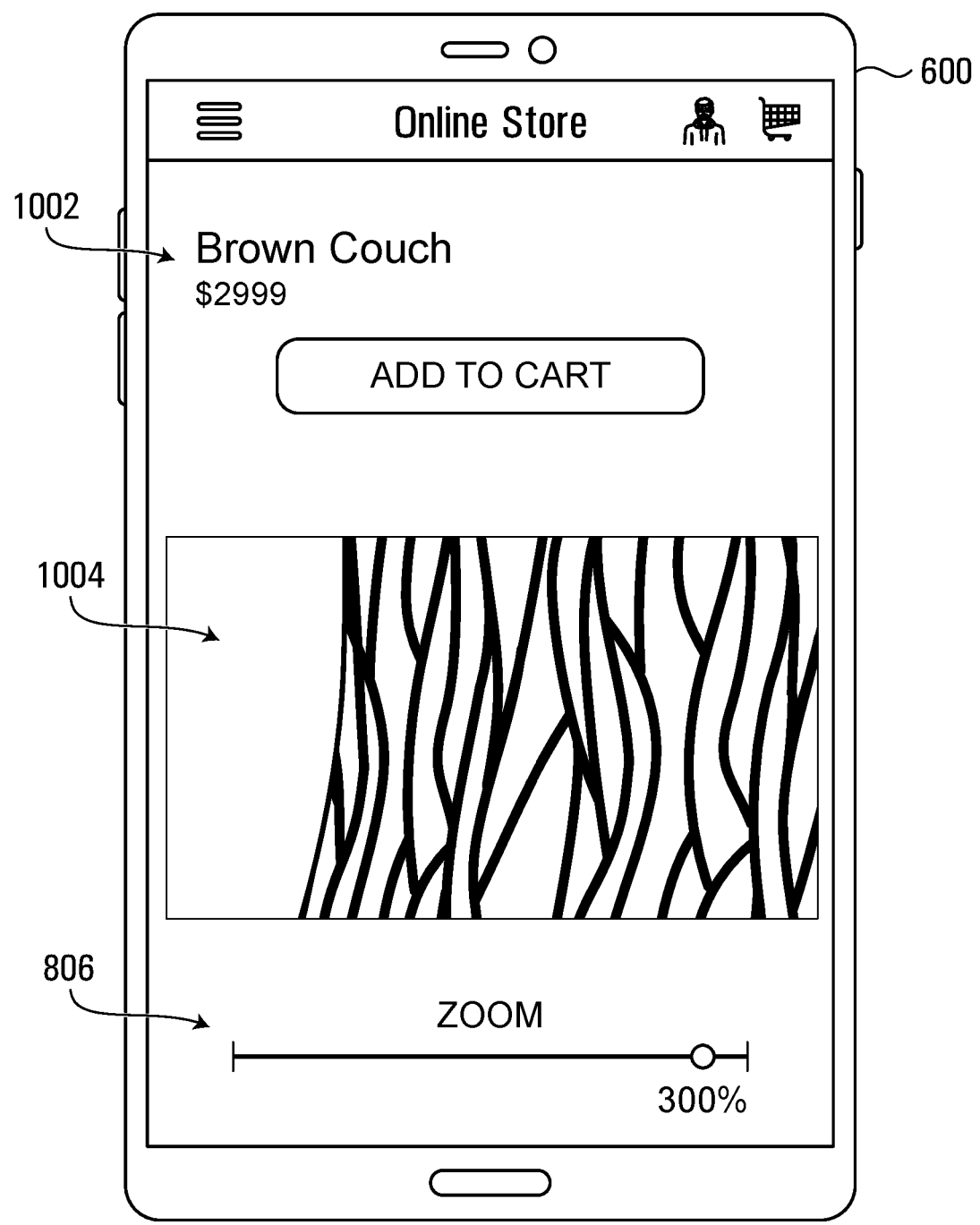

The 3D model of the couch cushions and/or the 3D model of the couch pillow may be manipulated via user input at the user device 600. For example, FIG. 12 illustrates the user device 600 displaying a further screen page 1002 of the online store including a render 1004 of the 3D model of the couch pillow. The render 1004 corresponds to a different viewpoint of the couch pillow as compared to the render 904 of FIG. 11. The render 1004 may have been generated in response to a user manipulating the 3D model of the couch pillow.

In some implementations, the screen pages 602, 702, 802, 902, 1002 may correspond to an AR experience implemented at the user device 600. For example, the digital media depicting the couch may be a 3D model of the couch that has been virtually mapped to a real-world environment surrounding the user device 600. The depiction 604 of the couch in the screen page 602 might be overlaid with an image of that environment, such that the couch appears to be present in the environment. The depiction 704 of the couch in the screen page 702 may be generated when the user device 600 is physically moved closer to the virtual position of the 3D model within the environment. When the user device 600 gets too close to the virtual position of the couch, such that the cushions of the couch can no longer be depicted with a target quality by the 3D model of the couch, then the 3D model of the couch may be replaced by the 3D model of the couch cushions. This may result in the generation of the render 804 in the screen page 802. Similar comments apply if the user gets too close to the virtual position of the pillow of the couch, which could result in the generation of the render 904 in the screen page 902. Moving the user device 600 relative to the couch pillow could also generate the render 1004 in the screen page 1002, which shows the pillow from a different perspective.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 13:
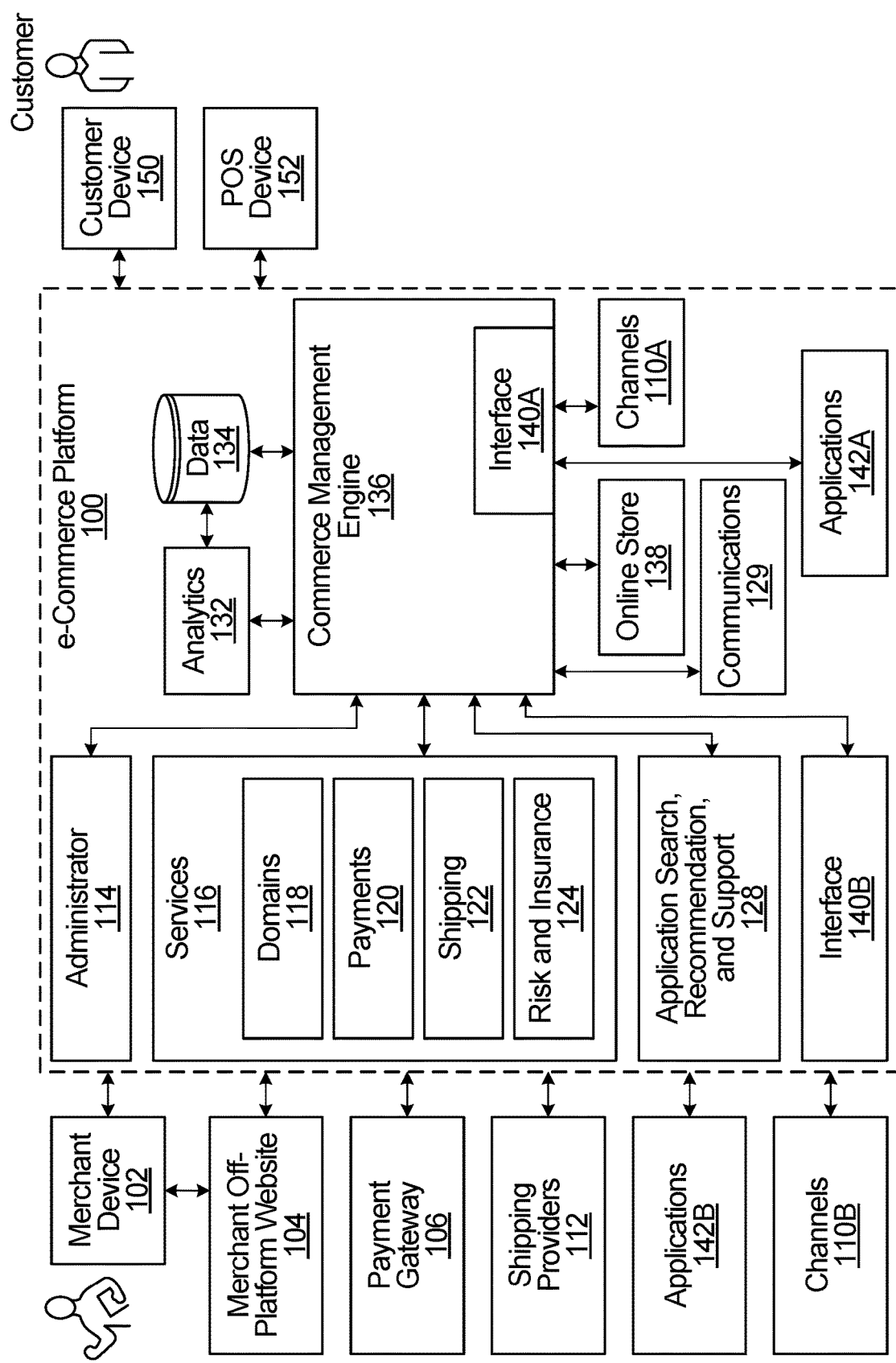
FIG. 13 is a block diagram of an e-commerce platform, according to an embodiment.

FIG. 13 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 13, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 14:
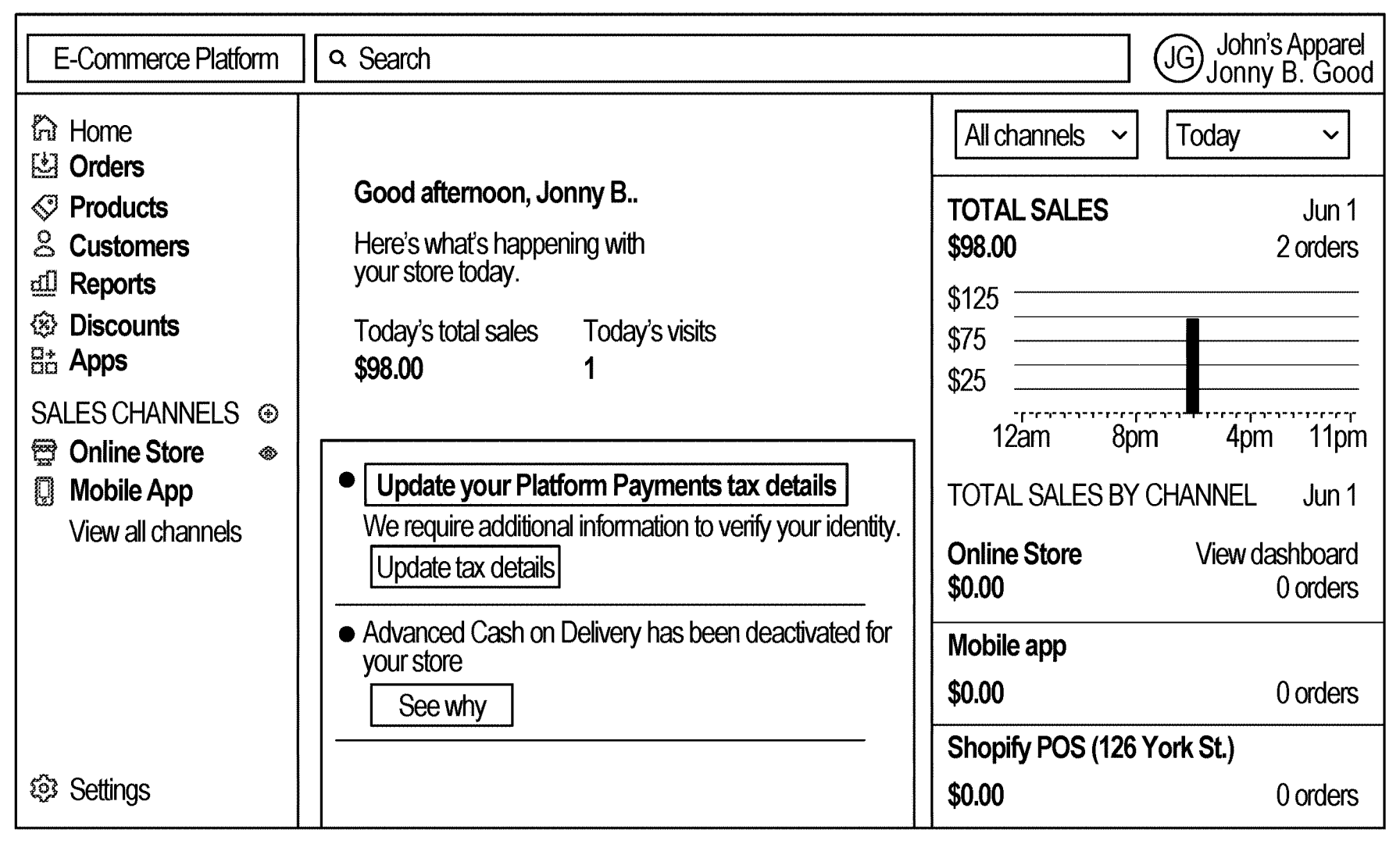

FIG. 14 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 14. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 13, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The invention claimed is:

1. A computer-implemented method comprising:
instructing a user device to display digital media depicting an object;
receiving an indication selecting a zoomed-in region of the depicted object, the zoomed-in region showing only a portion of the depicted object in the digital media, and the portion of the depicted object associated with a particular material of the depicted object;
responsive to receiving the selection of the zoomed-in region showing only the portion of the depicted object in the digital media that is associated with the particular material: instructing the user device to display a three-dimensional (3D) model representing the particular material corresponding to the selected zoomed-in region of the depicted object, the 3D model representing only a subset of the depicted object corresponding to the zoomed-in region and having a higher fidelity than the digital media, and the 3D model providing a detailed 3D representation of the particular material and surface texture of the depicted object in the selected zoomed-in region of the depicted object, and the 3D model being different from the digital media; and manipulating the 3D model based on user interactions to cause the user device to display different views of the particular material and surface texture based on renderings of the 3D model as manipulated.

2. The method of claim 1, further comprising:
determining, based on a criterion and the selected zoomed-in region, that the 3D model should be displayed on the user device,
wherein the user device is instructed to display the 3D model responsive to the determining.

3. The method of claim 2, wherein the criterion comprises a resolution for depicting the selected zoomed-in region with a target quality.

4. The method of claim 2, wherein the criterion comprises a zoom level for depicting the selected zoomed-in region with a target quality.

5. The method of claim 2, wherein the criterion comprises a fidelity for depicting the selected zoomed-in region with a target quality.

6. The method of claim 1, wherein the digital media comprises a plurality of identifiers corresponding to respective zoomed-in regions of the object, and instructing the user device to display the 3D model comprises:
determining a particular identifier of the plurality of identifiers that corresponds to the selected zoomed-in region; and
selecting the 3D model based on the particular identifier.

7. The method of claim 6, wherein:
the particular identifier corresponds to the particular material; and
the 3D model comprises a 3D representation of the particular material.

8. The method of claim 7, wherein the 3D model comprises a bump map.

9. The method of claim 1, wherein the selected zoomed-in region is a first region, the method further comprising, after instructing the user device to display the 3D model:
receiving a further indication selecting a second region of the depicted object;
determining, based on a criterion and the second region, that the digital media should be displayed on the user device; and
responsive to determining that the digital media should be displayed on the user device, instructing the user device to display the digital media.

10. The method of claim 1, wherein instructing the user device to display the 3D model comprises instructing the user device to display a render of the 3D model generated based on an orientation and a size of the selected zoomed-in region.

11. The method of claim 1, wherein instructing the user device to display the 3D model comprises:
determining lighting of the selected zoomed-in region as depicted in the digital media; and
applying the lighting to the 3D model.

12. The method of claim 1, wherein instructing the user device to display the 3D model comprises instructing the user device to replace the digital media with the 3D model on a display of the user device.

13. The method of claim 1, wherein:
instructing the user device to display the digital media comprises transmitting the digital media to the user device; and instructing the user device to display the 3D model comprises transmitting the 3D model to the user device.

14. The method of claim 1, wherein the digital media comprises a further 3D model.

15. A system comprising:
memory to store digital media depicting an object and a three-dimensional (3D) model representing a particular material corresponding to a zoomed-in region of the depicted object that is associated with the particular material, the 3D model being different from the digital media, and the 3D model representing only a subset of the depicted object corresponding to the zoomed-in region and having a higher fidelity than the digital media; and
at least one processor to:
instruct a user device to display the digital media;
receive an indication selecting the zoomed-in region of the depicted object, the zoomed-in region showing only a portion of the depicted object in the digital media, and the portion of the depicted object associated with the particular material of the depicted object;
responsive to receiving the selection of the zoomed-in region showing only the portion of the depicted object in the digital media that is associated with the particular material, instruct the user device to display the 3D model representing the particular material corresponding to the zoomed-in region of the depicted object, the 3D model providing a detailed 3D representation of the particular material and surface texture of the depicted object in the zoomed-in region of the depicted object; and
manipulate the 3D model based on user interactions to cause the user device to display different views of the particular material and surface texture based on renderings of the 3D model as manipulated.

16. The system of claim 15, wherein the at least one processor is to:
determine, based on a criterion and the zoomed-in region, that the 3D model should be displayed on the user device; and
instruct the user device to display the 3D model responsive to the determination that the 3D model should be displayed on the user device.

17. The system of claim 15, wherein the digital media comprises a plurality of identifiers corresponding to respective zoomed-in regions of the object, and the at least one processor is to:
determine a particular identifier of the plurality of identifiers that corresponds to the zoomed-in region; and
select the 3D model based on the particular identifier.

18. The system of claim 17, wherein:
the particular identifier corresponds to the particular material; and
the 3D model comprises a 3D representation of the particular material.

19. The system of claim 15, wherein the zoomed-in region is a first region, and the at least one processor is to:
receive a further indication selecting a second region of the depicted object;
determine, based on a criterion and the second region, that the digital media should be displayed on the user device; and
responsive to the determination that the digital media should be displayed on the user device, instruct the user device to display the digital media.

20. The system of claim 15, wherein the at least one processor is to instruct the user device to display a render of the 3D model generated based on an orientation and a size of the zoomed-in region.

21. The system of claim 15, wherein the at least one processor is to:
   determine lighting of the zoomed-in region as depicted in the digital media; and
   apply the lighting to the 3D model.

22. The system of claim 15, wherein the at least one processor is to instruct the user device to replace the digital media with the 3D model on a display of the user device.

23. The system of claim 15, wherein the 3D model comprises a high-resolution texture map, dense mesh and/or height map to illustrate 3D texture including surface elevation in order to provide the detailed 3D representation.

24. A non-transitory computer readable medium storing computer executable instructions which, when executed by a computer, cause the computer to:
   instruct a user device to display digital media depicting an object;
   receive an indication selecting a zoomed-in region of the depicted object, the zoomed-in region showing only a portion of the depicted object in the digital media, and the portion of the depicted object associated with a particular material of the depicted object;
   responsive to receiving the selection of the zoomed-in region showing only the portion of the depicted object in the digital media that is associated with the particular material: instruct the user device to display a three-dimensional (3D) model representing the particular material corresponding to the selected zoomed-in region of the depicted object, the 3D model representing only a subset of the depicted object corresponding to the zoomed-in region and having a higher fidelity than the digital media, and the 3D model providing a detailed 3D representation of the particular material and surface texture of the depicted object in the selected zoomed-in region of the depicted object, and the 3D model being different from the digital media; and
   manipulate the 3D model based on user interactions to cause the user device to display different views of the particular material and surface texture based on renderings of the 3D model as manipulated.

25. The method of claim 1, wherein the 3D model comprises a high-resolution texture map, dense mesh and/or height map to illustrate 3D texture including surface elevation in order to provide the detailed 3D representation.

* * * * *